United States Patent
Merrill

(10) Patent No.: US 8,122,255 B2
(45) Date of Patent: Feb. 21, 2012

(54) METHODS AND SYSTEMS FOR DIGITAL AUTHENTICATION USING DIGITALLY SIGNED IMAGES

(75) Inventor: Todd A. Merrill, Alpharetta, GA (US)

(73) Assignee: Global Crypto Systems, Alpharetta, GA (US)

( * ) Notice: Subject to any disclaimer, the term of this patent is extended or adjusted under 35 U.S.C. 154(b) by 1031 days.

(21) Appl. No.: 12/015,531

(22) Filed: Jan. 17, 2008

(65) Prior Publication Data

US 2008/0175377 A1 Jul. 24, 2008

Related U.S. Application Data

(60) Provisional application No. 60/881,649, filed on Jan. 22, 2007.

(51) Int. Cl.
*H04L 9/32* (2006.01)
(52) U.S. Cl. .................. 713/176; 713/180; 726/19
(58) Field of Classification Search .................. None
See application file for complete search history.

(56) References Cited

U.S. PATENT DOCUMENTS

| | | | |
|---|---|---|---|
| 5,689,567 A | 11/1997 | Miyauchi | |
| 6,487,660 B1 | 11/2002 | Vanstone et al. | |
| 6,553,493 B1 | 4/2003 | Okumura et al. | |
| 6,769,060 B1 | 7/2004 | Dent et al. | |
| 6,775,775 B1 | 8/2004 | Yoshiura et al. | |
| 6,804,356 B1 * | 10/2004 | Krishnamachari | 380/201 |
| 6,831,990 B2 | 12/2004 | Marvel et al. | |
| 6,975,746 B2 | 12/2005 | Davis et al. | |
| 6,980,081 B2 | 12/2005 | Anderson | |
| 7,092,545 B2 | 8/2006 | Seo et al. | |
| 7,100,049 B2 | 8/2006 | Gasparini et al. | |
| 7,107,452 B2 | 9/2006 | Serret-Avila et al. | |
| 7,159,113 B1 * | 1/2007 | Taniguchi et al. | 713/170 |
| 7,263,205 B2 | 8/2007 | Lev | |
| 7,366,301 B2 * | 4/2008 | Huang et al. | 380/51 |
| 7,490,240 B2 * | 2/2009 | Scheidt et al. | 713/176 |

(Continued)

FOREIGN PATENT DOCUMENTS

JP 2003224709 1/2002

(Continued)

OTHER PUBLICATIONS

Schneier, Bruce, entitled "Applied Cryptography", Second Edition: Protocols, Algorithms, and Source Code in C; chapters 2 and 3 on pp. 21-74; ISBN: 0-471-12845-7; copyright 1996, published by John Wiley & Sons.

(Continued)

*Primary Examiner* — Kaveh Abrishamkar
*Assistant Examiner* — Nadia Khoshnoodi
(74) *Attorney, Agent, or Firm* — Thomas, Kayden, Horstemeyer & Risley, LLP

(57) ABSTRACT

Various systems, methods, and programs embodied in computer-readable mediums are provided for digital authentication using digitally signed images. In one representative embodiment, a method includes extracting a first image portion from an image selected by a first party, where the first image portion including a first encoded part of an second party digital signature, and obtaining a second image portion associated with the first image portion, where the second image portion including a second encoded part of the second party digital signature. The first and second encoded parts of the second party digital signature are decoded and validity of the second party digital signature is confirmed based upon a second party public key.

40 Claims, 10 Drawing Sheets

U.S. PATENT DOCUMENTS

| | | |
|---|---|---|
| 2002/0044662 A1 | 4/2002 | Sowler |
| 2002/0083323 A1 | 6/2002 | Cromer et al. |
| 2002/0095579 A1 | 7/2002 | Yoshiura et al. |
| 2002/0168082 A1 | 11/2002 | Razdan |
| 2003/0163739 A1 | 8/2003 | Armington et al. |
| 2003/0185417 A1* | 10/2003 | Alattar et al. .................. 382/100 |
| 2004/0034779 A1 | 2/2004 | Wood et al. |
| 2004/0042641 A1* | 3/2004 | Jakubowski .................. 382/115 |
| 2005/0033966 A1 | 2/2005 | Johnson, Jr. |
| 2005/0044385 A1 | 2/2005 | Holdsworth |
| 2005/0102503 A1 | 5/2005 | Imai |
| 2005/0146614 A1 | 7/2005 | Silverbrook |
| 2005/0246536 A1* | 11/2005 | Roberts ......................... 713/176 |
| 2005/0269402 A1 | 12/2005 | Spitzer et al. |
| 2005/0276442 A1 | 12/2005 | Alasia et al. |
| 2006/0005042 A1 | 1/2006 | Black |
| 2006/0015734 A1 | 1/2006 | Atobe |
| 2006/0020815 A1 | 1/2006 | Varghese et al. |
| 2006/0029278 A1 | 2/2006 | Alasia et al. |
| 2006/0047967 A1 | 3/2006 | Akhan et al. |
| 2007/0022293 A1* | 1/2007 | Hayashi et al. ............... 713/176 |
| 2007/0033397 A1 | 2/2007 | Phillips, II et al. |
| 2007/0067642 A1 | 3/2007 | Singhal |
| 2007/0092102 A1 | 4/2007 | Kot et al. |
| 2007/0136573 A1 | 6/2007 | Steinberg |
| 2007/0143608 A1* | 6/2007 | Zeng et al. .................... 713/168 |
| 2007/0168657 A1 | 7/2007 | Carro |
| 2007/0174625 A1 | 7/2007 | Wuidart et al. |
| 2007/0192609 A1* | 8/2007 | Yoshioka et al. ............. 713/176 |
| 2007/0291936 A1* | 12/2007 | Milana et al. .................... 380/30 |
| 2008/0065821 A1* | 3/2008 | Robotham .................... 711/108 |

FOREIGN PATENT DOCUMENTS

| | | |
|---|---|---|
| WO | WO0250773 | 6/2002 |

OTHER PUBLICATIONS

Gonzalez, Rafael and Woods, Richard, entitled 'Digital Image Processing', Section 1.4 Elements of Digital Image Processing on pp. 10-19, Chapter 2 on pp. 21-75, Chapter 3 on pp. 81-93, Section 3.5.3 Discrete Cosine Transform on pp. 143-145; ISBN 0-201-50803-6, copyright 1992 Addison-Wesley.

Viega, John and Messier, Matt, entitled "Secure Programming Cookbook(tm) for C and C++", Chapter 4 on pp. 116-154, Chapter 7 on pp. 307-361; ISBN 0-596-00394-3, copyright 2003, O'Reilly Media, Inc.

Viega, John, Messier, Matt and Pravir, Chandra, entitled "Network Security with OpenSSL", Chapter 1 on pp. 1-28; ISBN 0-596-00270-X, Copyright 2002, O'Reilly Media, Inc.

Yang Zhao, Patrizio Campisi and Deepa Kundur, entitled Dual Domain Watermarking for Authentication and Compression of Cultural Heritage Images, IEEE Transactions on Image Processing, vol. 13. No. 3, Mar. 2004, 19 pages.

* cited by examiner

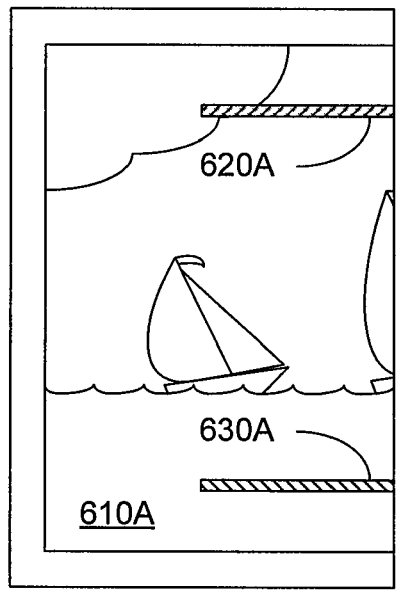
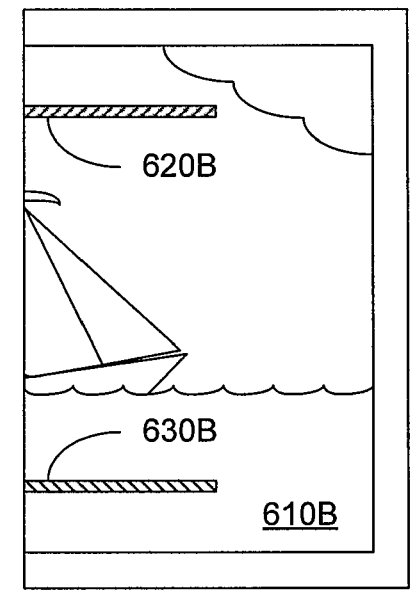
FIG. 6A  FIG. 6B
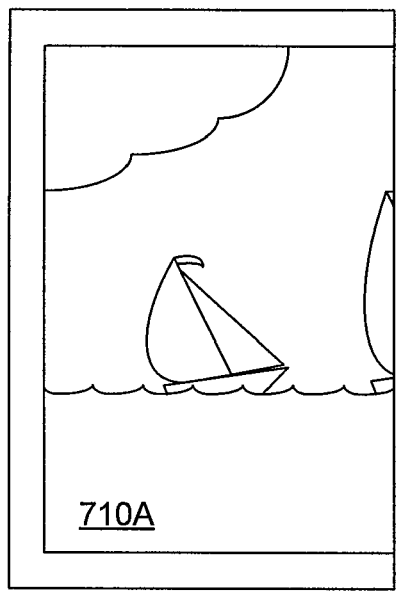
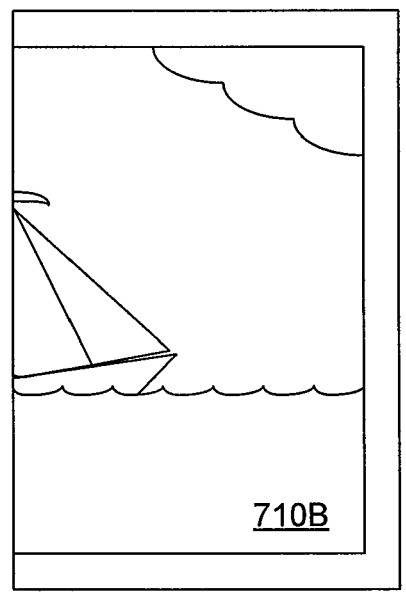
FIG. 7A  FIG. 7B

METHODS AND SYSTEMS FOR DIGITAL AUTHENTICATION USING DIGITALLY SIGNED IMAGES

CROSS REFERENCE TO RELATED APPLICATIONS

This application claims priority to: U.S. Provisional Application No. 60/881,649 entitled "A NEW METHOD FOR DIGITAL AUTHENTICATION ON THE WORLD-WIDE-WEB USING PUBLIC KEY CRYPTOGRAPHY TO DIGITALLY SIGN IMAGES AND THE DISPERSION OF THE IMAGE INFORMATION BETWEEN THE AUTHENTICATING PARTIES" filed on Jan. 22, 2007, the application being incorporated herein by reference in its entirety.

BACKGROUND

The amount of information transmitted between parties across the world-wide-web is increasing daily. The security of these transactions is a continuous concern of governments, financial institutions, businesses and their clients. In an effort to provide a secure environment during a transaction, digital authentication of the parties is obtained before transmitting private information. However, current authentication methods are still vulnerable to "phishing", "man-in-the middle" and "man-in-the-browser" attacks by individuals seeking to obtain unauthorized access to the transaction information. Thus, stronger authentication and transaction verification methods are desirable.

SUMMARY

Embodiments of the present disclosure methods and systems related to digital authentication using digitally signed images.

Briefly described, one embodiment, among others, comprises a method. The method comprising encoding a first party digital signature in a first signature region of a first image and encoding a second party digital signature in a second signature region of the first image to produce a first encoded image and separating the first encoded image into a first portion and a second portion, the first portion including a first part of the first party digital signature and a first part of the second party digital signature and the second portion including a second part of the first party digital signature and a second part of the second party digital signature.

Another embodiment, among others, comprises a method. The system comprising encoding N digital signatures in N corresponding signature regions of a first image, each digital signature associated with at least one of N parties and separating the first encoded image into M portions, each portion including a first part of at least one of the N digital signatures.

Another embodiment, among others, comprises a method. The method comprising: extracting a first image portion from an image selected by a first party, the first image portion including a first encoded part of an second party digital signature; obtaining a second image portion associated with the first image portion, the second image portion including a second encoded part of the second party digital signature; decoding the first and second encoded parts of the second party digital signature; and confirming validity of the second party digital signature based upon a second party public key.

Other systems, apparatus, methods, features, and advantages of the present disclosure will be or become apparent to one with skill in the art upon examination of the following drawings and detailed description. It is intended that all such additional systems, apparatus, methods, features, and advantages be included within this description, be within the scope of the present disclosure, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 6A and 6B are illustrations of first and second portions of the first image of FIG. 5 according to an embodiment of the present invention;

FIGS. 7A and 7B are illustrations of first and second portions of a second image of the digital image of FIG. 2 according to an embodiment of the present invention;

DETAILED DESCRIPTION

Figure 1:
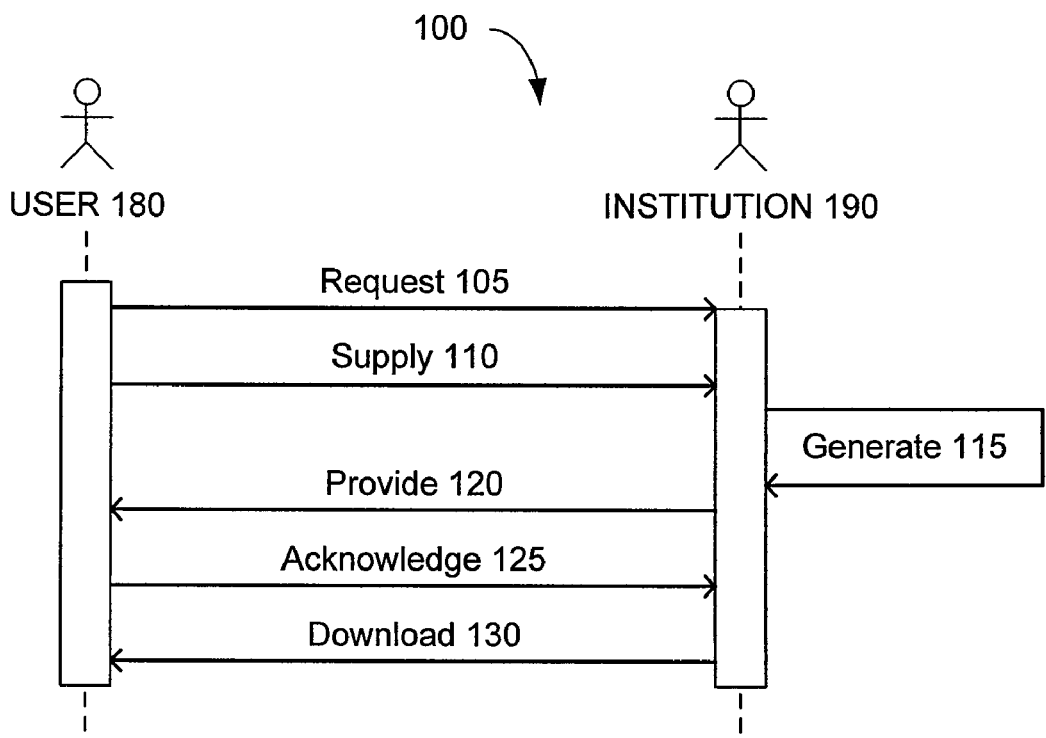
FIG. 1 is an illustration of a method to establish a key image for digital authentication according to an embodiment of the present invention.

Disclosed herein are various embodiments of methods and systems related to digital authentication using digitally signed images. Reference will now be made in detail to the description of the embodiments as illustrated in the drawings, wherein like reference numbers indicate like parts throughout the several views.

With the development and refinement of the world-wide-web, the amount and variety of information being transferred between individuals, businesses, institutions, and/or government agencies has grown to staggering proportions. As the information became vulnerable to unauthorized third party access, secure means of transfer became increasingly important. Initially, a simple user name and password were used to protect information during transmission to its destination. This method uses a single factor (e.g., something you know) to authenticate that a party was allowed to access the transferred information. As hackers became more sophisticated, this approach became more vulnerable to attacks. Multi-factor authentication improves the security of information by requiring knowledge of two or more factors (e.g., something you know, something you have, somewhere you are, something you are) before access is granted.

In the present disclosure, multi-factor authentication of two parties may be achieved through the exchange of pieces of digitally signed images, signals, or files. While embodiments presented in the disclosure refer to digital images, the methods and systems presented can be equally applicable to other digital files or signals including, but not limited to, audio and video elements. In one embodiment, among others, a digital image is provided at the introduction of the two parties. The image is digitally signed by both parties and physically divided between the two parties as portions of a shared credential for later exchange. The digital signatures may be encoded into the shared image for later extraction using public key cryptography, digital watermarking, steganography, or other appropriate methods. Each party to the authentication takes a physical portion of the shared credential, which includes encoded parts of each digital signature and forms one shared secret between the two parties. Distributing portions of the shared credential ensures that neither party has the whole encoded image or a complete digital signature. In one embodiment, certain insignificant bits in the image are altered to encode the digital signatures of the two authenticating parties. These pre-determined bits may be chosen so a viewer's perception of the key image is not affected when displayed.

Additionally, other base cryptographic elements may be encoded into the key image, or its portions, to allow for efficient and simple distribution of cryptographic keys for use in a public key infrastructure. In addition to representing the User's portion of the shared credential, the key image may hold cryptographic elements within its information.

A second party may retain a first party's portion of the shared credential, but it may be digitally altered in a manner so that it cannot be used to spoof the first party. For example, a Bank may escrow a User's portion of a shared credential. In addition, a party may publish the key image, or its portions, on a local network or on the web and a casual observer will not be able to discern the unique nature of the key image when compared with the original unaltered image. Thus a second party may use a key image published on the Internet for authentication with the first party.

This method for the use of a shared credential may be extended to other digital data elements that are easily recognized by natural human perception. Most notably, digitally encoded audio signals may be used to accomplish the same authentication. The use of a key audio clip may be more appropriate for digital devices such as a cell phone or audio players having audio playback capabilities with limited visual displays. Video signals may also be used to provide key elements such as a key video clip, a key image, a key audio clip, or combinations thereof. Similar to the key image, bits in audio or video signals may be chosen to not affect the listener's and/or viewer's perception of the digital signals. The storage of key elements can be on a public Internet site or on restricted media such as, but not limited to, a smart card, USB Key, CD-ROM, or other secure media.

Authentication of a key image, or other key element, is performed electronically. In one embodiment, among others, a first party may want to establish a secure transmission with a second party. Upon establishment of a Secure Sockets Layer (SSL) session to a web server, the first party is prompted by local application running on a processor such as, but not limited to, a browser extension, for the location of a key image file along with a passkey associated with the key image. The local application uses the passkey to decrypt a server-side public key that may be encoded in the image, which may be used for server connection verification. Authentication may only proceed if the encoded server-side public key corresponds to (e.g., is identical to, is related to, or produces) the public-key in use in the SSL session to the server. If the public-key comparison is valid, the first party's local application (e.g., web browser) transmits the first party's portion of the shared credential to the server for authentication.

An account number may also be transmitted or it may be derived from a hash of the transmitted shared credential portion. The server may use the account number to retrieve its corresponding portion of the shared credential. The shared credential is reassembled from the shared credential portions by the server and used to verify the second party digital signature. After the server has completed the verification, the web server transmits its portion of the shared credential to the first party over the SSL connection. The local application reassembles the key image and checks the first party digital signature. At this point, the first and second parties are mutually authenticated. In another embodiment, the server first sends its portion of the shared credential for verification by the local application. When verified, the local application sends the first party's portion of the shared credential to the server for authentication.

This method may be used in conjunction with other cryptographic elements such as the use of SSL for accessing HTTPS websites on the public Internet. The transmittal of the portions of the shared credential between the authenticating parties may be encrypted using public key cryptographic techniques. The public keys may already be known and/or they may be contained in the key image portion of the other party. Note that all cryptographically sensitive elements encoded in the key image may also be encrypted using a symmetric cipher utilizing the party's passkey as an encryption key.

Since a digital image (key image), or other key element, may be used as a vehicle for exchanging cryptographic information, the image may also be used as a strongly random input to generate a party's cryptographic key pairs. This relieves the party of making up passwords or pass-phrases, which are the weakest parts of traditional username/password authentication, since parties frequently generate cryptographically weak or easily guessable passwords.

Moreover, the use of a unique digital image to serve as a shared secret augments the cryptographic methods of public key cryptography since a party can readily identify the image or a portion of the image. In one embodiment, among others, the key image may be used as a prompt for subsequent multivariate authentication factors. For example, a first party may use a picture of his dog as the basis for a key image. Upon successful authentication, a second party would prompt the first party with a question such as "Who is in this picture?" The first party would need to provide the proper answer, for example "My pet dog Fido," before the second party would proceed.

In at least one embodiment, these methods may provide an easy way for the non-technical parties to participate in strong cryptographic authentication for transmission of private information, while combating "phishing", "man-in-the middle", and "man-in-the-browser" attacks on financial institutions and their internet-active customers whereby criminals seek to obtain user credentials from banking customers by spoofing the financial institution's internet presence.

In the following descriptions, the terms "User" and "Institution" are used to distinguish parties. The descriptions may be equally applied to first, second, and/or additional parties. One skilled in the art would understand that the methods and systems described could also apply to other combinations including, but not limited to, User-User, Institution-Institution, or other scenarios including three or more parties. Also, multiple signatures and/or keys associated additional parties may be encoded into an image used to generate key images. The image may then be split into multiple portions, each portion containing parts of some or all of the signatures and/or keys, before providing a portion (or key image) to each of the additional parties. In addition, signatures and keys may be encoded in more than one location within an element. Similarly, signatures and keys may be separated into parts before encoding each part or a signature or key in adjacent or separated locations.

FIG. 1 is an illustration of a method 100 to establish a key image for digital authentication according to an embodiment of the present invention. The method 100 may also be used to establish other key elements such as, but not limited to, key audio clips and key video clips. The method 100 to generate a key image may be accomplished remotely through an online Internet session or in person as a part of a physical exchange of information. Institutions, or other entities or parties may include key image generation as part of an initial account setup and/or may add key image authentication to existing accounts using current authentication methods to first verify the identity of current account holders.

Referring to FIG. 1, initially User 180 requests 105 Institution 190 to establish an account that provides for the secure transfer of private information. This request 105 includes the User 180 providing, to the Institution 190, an image selected by the User 180 to generate a key image. A wide variety of images and image formats can be acceptable. An image may supply sufficient cryptographic entropy to generate cryptographic key pairs while also containing sufficient cryptographic "carrier information" to cover the steganographically encoded information (e.g., digital signatures and key pairs). For example, digital pictures from cameras, such as those found on high-end cell phones, may produce suitable images.

Figure 2:
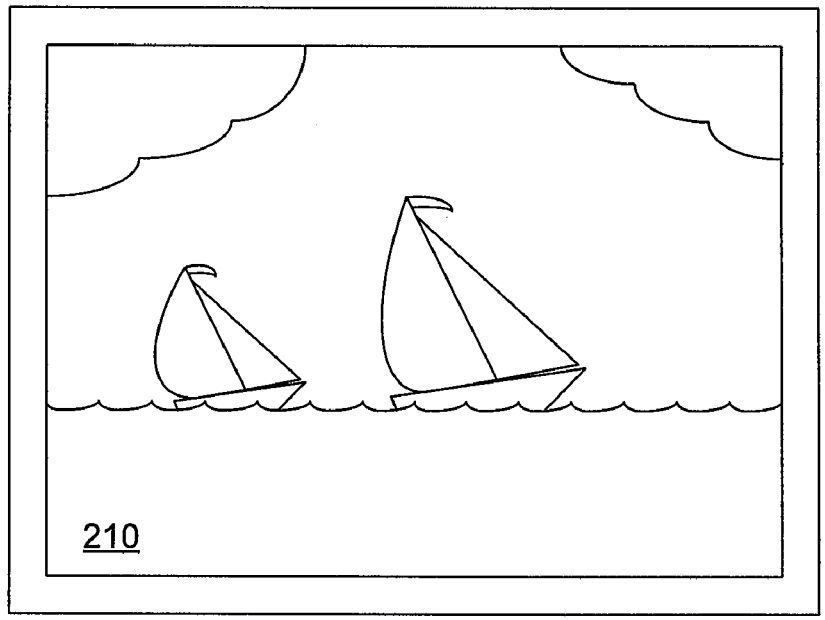
FIG. 2 is an illustration of a digital image selected in the method of FIG. 1 as the basis for the key image according to an embodiment of the present invention.

FIG. 2 is an illustration of a digital image 210 selected in the method of FIG. 1 as the basis for the key image according to an embodiment of the present invention. The request 105 may be accomplished through a typical Internet transaction where the User 180 transmits the image 210 to the Institution 190 over a secure web link (HTTPS). Remote transmission may also be accomplished through e-mail, facsimile, or other appropriate means. Alternatively, the Institution 190 may provide a database of images from which the User 180 may select the image 210 for generating the shared credential. The database may include, but are not limited to, images of corporate logos, institutional seals, and credit cards.

User 180 may also provide a photograph or other copy of an image for conversion to digital image 210. Clients or Users 180 may also provide the digital image 210, or other digital element (e.g., audio or video clips), on a CD/DVD, floppy disk, jump drive, removable USB key, email, PDA, cell phone, MP3 player, digital media storage unit, or other network transmission medium. The digital image 210 may be in any common format such as, but not limited to, JPEG, GIF, TIFF, BMP, or other image formats. Similarly, audio and video clips may be provided in any appropriate format.

The server processing of the institution 190 may temporarily store the digital image 210. While the image 210 may be deleted once the method 100 to generate the key image is complete, some Institutions may wish to preserve the original image 210 for archival purposes. A generic database application can serve to store these images or other elements.

In addition to providing the image 210, the User 180 may also supply 110 a password or phrase. The supplied 110 password/phrase may be used for encryption during the generation of the key image pair.

Figure 3:
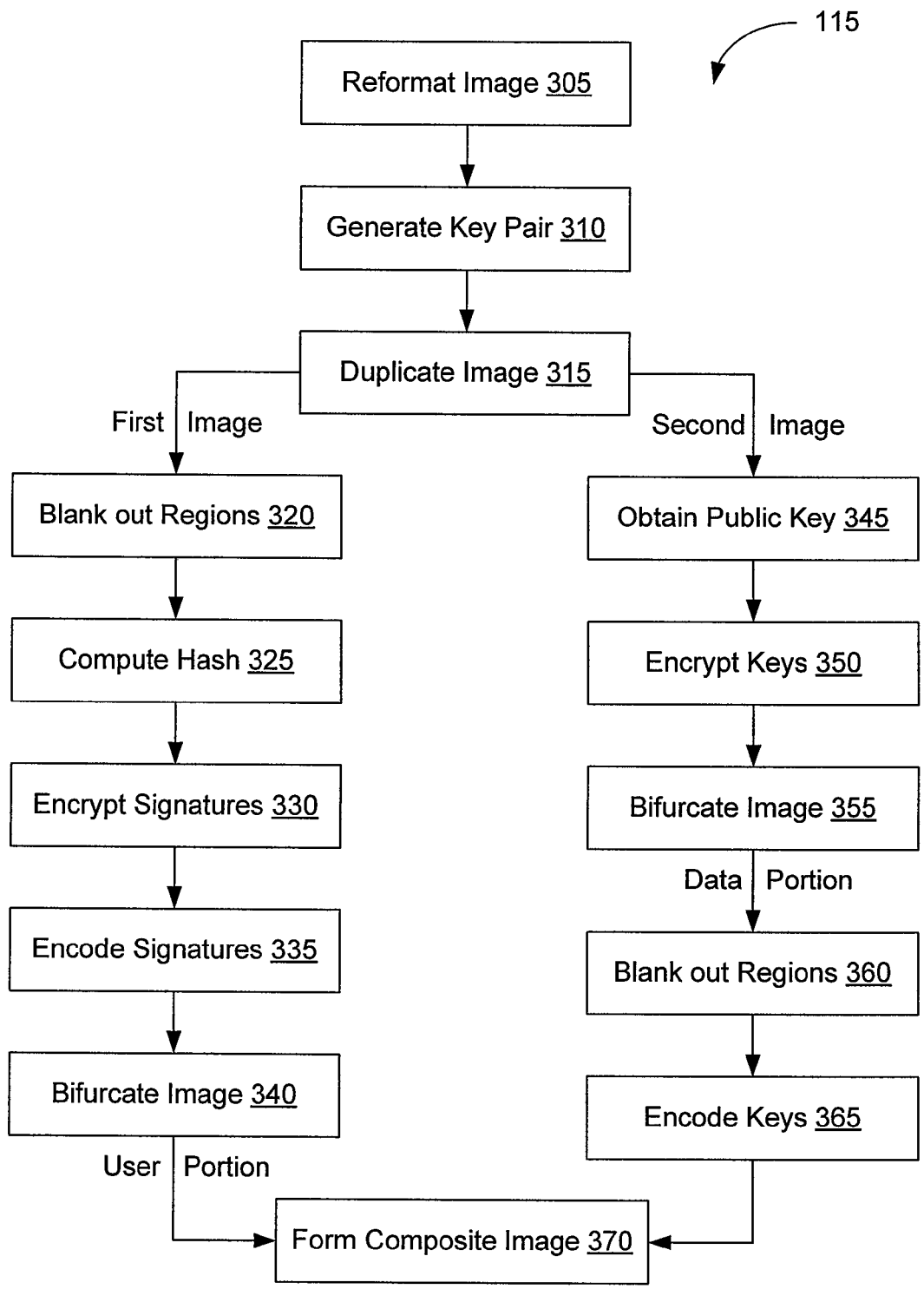
FIG. 3 is a flow chart of one example method used to generate the key image in the method of FIG. 1 according to an embodiment of the present invention.

Once the digital image 210 is received by the Institution 190, the image 210 is used to generate 115 the key image pair. FIG. 3 is a flow chart of one example method used to generate 115 the key image in the method of FIG. 1 according to an embodiment of the present invention. In block 305 of FIG. 3, the digital image 210 may be reformatted by resizing the image 210 and/or converting the image 210 to a suitable format such as, but not limited to, a TIFF, BMP, or portable network graphics (.png) file. The resolution of the image 210 may also be adjusted during reformatting.

A cryptographic key pair is generated for User 180 in block 310. The key pair (public and private keys) may be produced based upon the entropy of digital image 210, either unaltered or reformatted, using RSA, DSA, Diffie-Hellman, or other appropriate method. In one embodiment, among others, a random sequence of bytes taken from image 210 may be used to seed a pseudo random number (PRN) generator of a cryptographic engine. One method to accomplish the PRN seeding is to use a serial sequence of bytes from the file representation of the image 210 as the seed. More elaborate methods of extracting randomness from an image include, but are not limited to, selection of least significant bits (LSB) from high frequency portions of the image. Portions of the image can be selected based upon frequency analysis in the frequency domain after a transform such as, but not limited to, a Fast Fourier Transform (FFT) or discrete cosine transform (DST) is applied to the image. Any random or pre-determined selection of bits from the image may be used to seed the PRN engine including, but not limited to, variable PRN seeding vectors.

The image 210 is duplicated in block 315. A first image 410 (FIG. 4) is used to encode User 180 and Institution 190 signatures. The second image (710A and 710B of FIG. 7) may be used to encrypt keys such as, but not limited to, the key pair of User 180, a public key of Institution 190, and other keys that may be used during an authentication session. While the processing of the first and second images is illustrated in parallel, is should be understood that processing of the images in other orderings may also be used.

Figure 4:
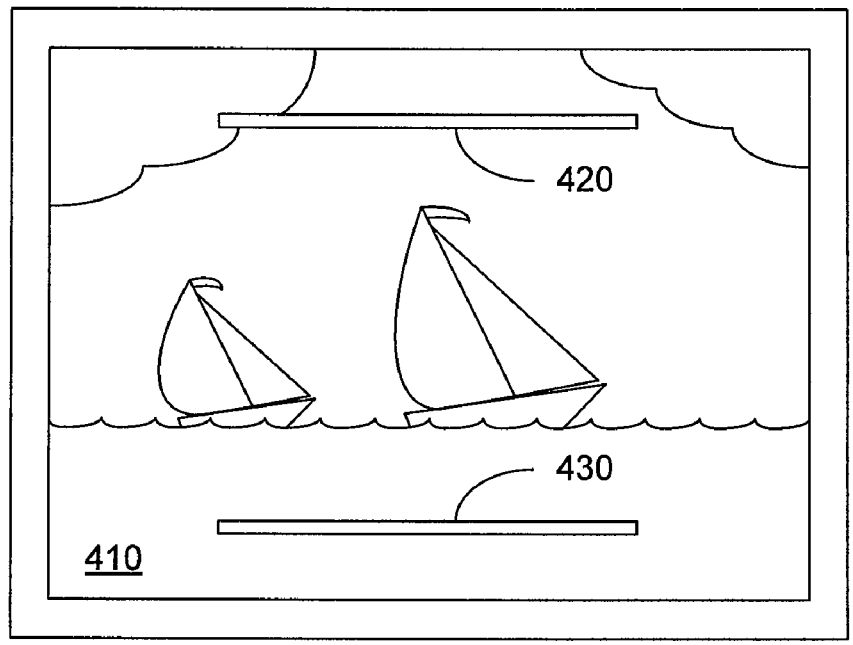
FIG. 4 is an illustration of a first image of the digital image of FIG. 2 including blanked signature regions according to an embodiment of the present invention.

Signature regions are blanked out of the first image in block 320. FIG. 4 is an illustration of a first image 410 of the digital image 210 of FIG. 2 including blanked signature regions 420 and 430 according to an embodiment of the present invention. The signature regions 420 and 430 may be blanked using the least significant bits (LSBs) of color components for certain pixels of the first image 410. One or more of the LSBs of each color component are used so that the visual impact of the first image 410 is not affected to a point that a viewer would notice a variation of the image quality.

In one embodiment, among others, the first image 410 is converted into a raw pixel format including three color components (red, green, and blue) and opacity. The converted image is put through a filter that zeros out designated bits in the image 410 that will later be encoded with the digital signatures from the Institution 190 and the User (or Client) 180. In one embodiment, the two LSBs of each of the color components are used to encode the digital signatures of the User 180 and the Institution 190. In another embodiment, the three LSBs of two color components and the two LSBs of the third color component are used to encode the digital signatures. Other combinations may also be utilized without affecting image quality. The number of bits necessary to encode a given digital signature is based upon the cryptographic methods used to generate the signature. An image should contain enough pixels to encode both digital signatures. For example, a typical digital signature may take 256 bytes to encode. With eight bits per byte (8 bits/byte), this signature would need 2048 bits to encode. If each pixel can provide 6 bits of data (e.g., two for each color component), this signature would need 2048 bits/(6 bits/pixel)=342 pixels to be encoded.

A variety of methods exist for choosing the location of a signature region. The signature regions 420 and 430 can be statically predetermined or can be allocated in a dynamically deterministic fashion through the use of an allocation vector. Methods using a signature region allocation vector should ensure that the bits used for one signature or watermark do not interfere with the bits allocated for other signature elements in the same image. In one embodiment, among others, the signature region allocation method uses the LSBs from each color component from each pixel in the first line as the signature region to encode the digital signature of User 180. Likewise, the signature region for the Institution 190 may use the last row of pixels to carry the Institute's encoded digital signature. In FIG. 4, the blanked User signature region 420 and the blanked Institute signature region 430 are illustrated as being located in rows other than the first and last. In other embodiments, the signature regions may be in other locations and can include different orientations. Also, a signature may be separated into two or more parts before encoding into different signature regions.

In the embodiment illustrated in FIG. 4, the pixels selected to carry the encoded signature are centered about the vertical axis of the first image 410. Upon bifurcation of the first image 410 along the vertical axis, the signature regions 420 and 430 will be cut in half. For example, in an embodiment using the typical digital signature described above, digital signatures would be encoded in the center of designated rows of the image. As such, each digital signature would begin at a location 171 pixels (i.e., one half of 342 pixels) before the centerline of the designated row. Thus, when the image is bifurcated at the vertical centerline, half of each signature goes with each half of the picture. Other embodiments may locate the signature regions in other positions that allow for splitting the image into unequal or multiple portions. In addition, in some embodiments, the signature regions may not be equally divided upon the splitting of the first image 410.

An alternate method may be used when the desired output format uses a lossy compression technique such as, but not limited to, JPEG. JPEG formatted pictures can use bits that are encoded in the discrete cosine transform (DCT) coefficients in the frequency domain of an image. A transform such as, but not limited to, a Fast Fourier Transform may be used to analyze the image in the frequency domain. Other methods include storing bits in a non-sequential but deterministic manner. For example, a "walking" algorithm can be used to encode designated bits in a signature region by choosing subsequent pixels as x-pixels in the vertical direction and y-pixels in the horizontal direction from the previous pixel. The number of vertical and horizontal pixel displacement (x and y respectively) may be determined using a governing function such as, but not limited to, a linear, elliptical, or parabolic curve.

Once the designated signature regions 420 and 430 are blanked out in block 320, a hash is computed from the first image 410 using a cryptographic hash function such as, but not limited to, SHA-1, RIPEMD-160, WHIRLPOOL, MD5, or other appropriate functions in block 325. The computed hash can be encrypted in block 330, using the private key of the User 180 and the private key of the Institution 190, to form the two digital signatures, one corresponding to the User 180 and one corresponding to the Institution 190. The digital hash may be encoded using public/private key cryptography such as, but not limited to, RSA or DSA encryption.

Figure 5:
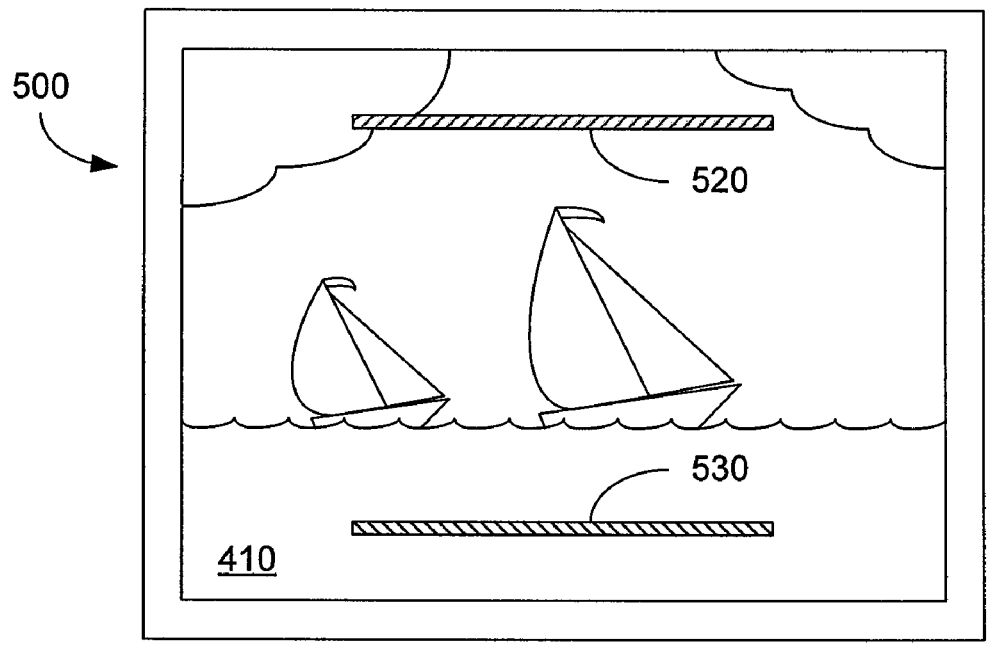
FIG. 5 is an illustration of the first image of FIG. 4 including the signature regions encoded with encrypted signatures according to an embodiment of the present invention.

In block 335, the encrypted signatures of the User (or Client) 180 and the Institution 190 may be incorporated into their respective signature regions. FIG. 5 is an illustration of the first image 410 of FIG. 4 including the signature regions 520 and 530 encoded with encrypted signatures according to an embodiment of the present invention. In the embodiment of FIG. 5, each signature is encoded on the designated signature region bits producing an encoded signature region 520 for the User 180 and an encoded signature region 530 for the Institution 190 to form a shared credential 500. Later these signatures may be decrypted and verified using the respective public keys of the User 180 and the Institution 190.

In other embodiments, a watermark may be steganographically added to the first image 410 to brand the encoded image for identification. In one embodiment, the watermark indicates that the first image 410 has been manipulated using a known implementation. In another embodiment, a third digital signature may also be included in the first image 410 to document that it was generated by certain software elements. In other embodiments, the watermark may contain information recording the originating device used during enrollment. This information may include, but is not limited to, a machine identifier that may be used to detect if a key image is being used on a machine other than the originating device. Authentication using a different machine is possible, but this information may be propagated to fraud detection engine as evidence of a risk factor that warrants further scrutiny.

After the digital signatures are encoded in regions 520 and 530 of image 410, the Institution 190 splits the first image 410 in block 340. In one embodiment, among others, the image is evenly bifurcated along its vertical axis. FIGS. 6A and 6B are illustrations of first and second portions 610A and 610B of the first image 410 of FIG. 5 according to an embodiment of the present invention. In the embodiment of FIGS. 6A and 6B, the separation forms a left-half portion 610A and a right-half portion 610B. The right-half portion 160B is retained exclusively by the Institution 190 and the left-half portion 160A is retained by the User 180. Some Institutions 190 may wish to retain both portions 160A and 160B for future reference.

When splitting the first image 410, the signature regions that carry the encoded digital signatures 520 and 530 are also bifurcated along with the greater image 410. Thus, the User portion 610A of the image retains portions 620A and 630A of both the encoded User and Institute digital signatures, respectively. Likewise, the Institute portion 610B includes portions 620B and 630B of both the encoded User and Institute digital signatures, respectively. While the encoded signature regions 520 and 530 of FIG. 5 are illustrated as being equally divided between the User and Institute portions 610A and 610B, respectively, it should be understood that other embodiments may include unequal and/or multiple divisions of the encoded signature regions 520 and 530.

Other geometric splits are possible including splits along diagonal axes and irregular curves such as can be found on a jigsaw puzzle. These separations will produce first and second portions that can be equivalent to the left-hand and right-hand portions discussed above. Additional authentication strength may be possible by splitting the image in atypical ways such that incorrect reconstruction of the two parts of the image would prevent accurate signature extraction. In other embodiments, extraneous image elements may be added to an image to extend the image and/or to add cryptographic "salt" to the image. This added cryptographic salt is intended to hinder cryptanalysis for the purpose of breaking, reverse engineering, or thwarting the encryption scheme.

Referring now to FIG. 3, the public key for the web server of the Institute 190 is obtained in block 345. The Institute public key and the User key pair generated in block 310 may be encrypted in block 350 using the User 180 supplied password or phrase. The keys may be encrypted using a symmetric key encryption such as, but not limited to, blowfish, advanced encryption standard, serpent, Vigenere cipher, Playfair cipher, Hill cipher, CRYPT, Enigma, Lucifer, DES, GOST, and RC4.

In block 355, the second image of the digital image 210 is bifurcated in the same way as the first image 410 in block 340 to form first and second portions that are substantially similar to the first and second portions of the first image 410. FIGS. 7A and 7B are illustrations of first and second portions 710A and 710B, respectively, of a second image of the digital image 210 of FIG. 2 according to an embodiment of the present invention. As with the first image 410, separation of the second image forms a first left-hand portion 710A and a second right-hand portion 710B. The right-hand portion 710B can be used as a data portion 710B to encode digital keys and other cryptographic information for use during authentication. In one embodiment, the data portion 710B may also be encoded with an identifying factor of the enrolling device. For example, an identification number associated with a computer or a cellular telephone's ESN may be used to determine if a User is returning to a trusted piece of hardware. In embodiments where the first image 410 is split into multiple portions, the second image will be split into multiple portions with each portion substantially similar to the corresponding portion of the first image 410. Digital keys or other cryptographic information may be encoded in portions that may or may not include portions of the encoded digital signatures.

Figure 8:
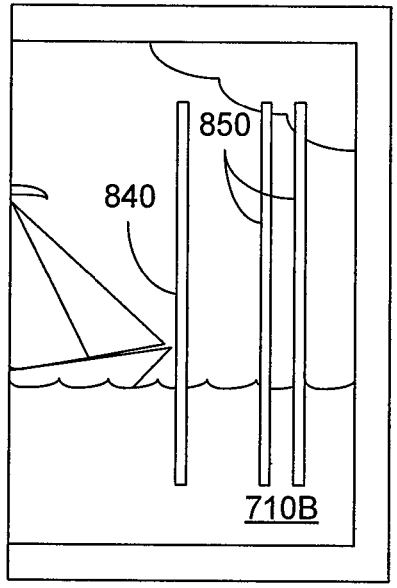
FIG. 8 is an illustration of the second portion of the second image of FIG. 7B including blanked key regions according to an embodiment of the present invention.

Key regions are blanked out of the right-hand data portion 710B of the second image in block 360. FIG. 8 is an illustration of the second (or data) portion 710B of the second image of FIG. 7B including blanked key regions 840 and 850 according to an embodiment of the present invention. In the embodiment of FIG. 8, a first key region 840 is associated with the Institution public key and two additional key regions 850 are associated with the User key pair. The key regions 840 and 850 may be blanked using the same methods described for blanking signature regions 420 and 430 in block 330.

As with signature regions, a variety of methods exist for choosing the location of a key region. The key regions 840 and 850 can be statically predetermined or can be allocated in a dynamically deterministic fashion through the use of an allocation vector. Methods for a key region allocation vector should ensure that the bits used for one signature or watermark do not interfere with the bits allocated for other key elements in the same image. In FIG. 8, the blanked key regions 840 and 850 are in parallel columns located toward the right side of the data portion 710B. In other embodiments, key regions may be in other locations and can have different orientations. Also, in embodiments including multiple portions, one or more image portions may be used to allocate key regions.

Figure 9:
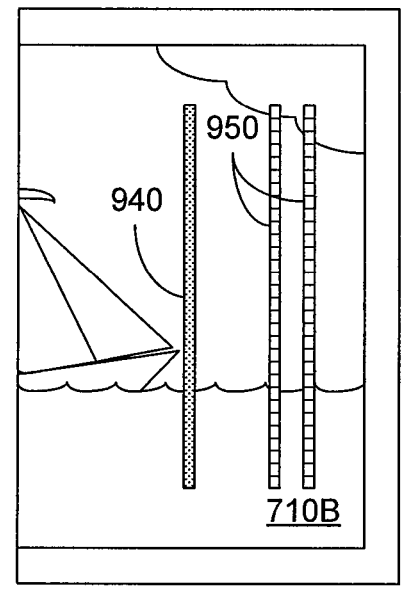
FIG. 9 is an illustration of the second portion of the second image of FIG. 8 including the key regions encoded with encrypted keys according to an embodiment of the present invention.

Once the designated key regions 840 and 850 are blanked out in block 360, the encrypted Institution public key and User key pair may be incorporated into their respective key regions in block 365. FIG. 9 is an illustration of the second (or data) portion 710B of the second image of FIG. 8 including the key regions 940 and 950 encoded with encrypted keys according to an embodiment of the present invention. In the embodiment of FIG. 9, each key is encoded on the designated signature region bits producing an encoded key region 940 for the Institution public key and encoded key regions 950 for the User key pair. Also, a key may be separated into two or more parts before encoding into different key regions.

Figure 10:
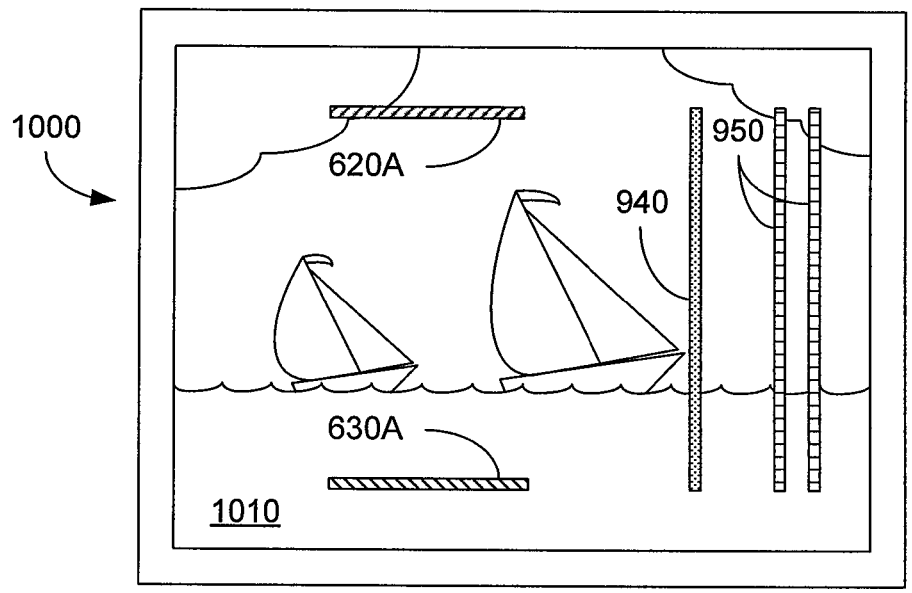
FIG. 10 is an illustration of an encoded composite image formed from the first image portion of FIG. 6A and the second image portion of FIG. 9 according to an embodiment of the present invention.

In block 370, the User portion 610A of FIG. 6A and the encoded data portion 710B of FIG. 9 are combined to form an encoded composite image. FIG. 10 is an illustration of an encoded composite image 1010 formed from the first image portion 610A of FIG. 6A and the second image portion 710B of FIG. 9 according to an embodiment of the present invention. The composite image 1010 is encoded with portions of the User and Institute passwords 620A and 630A, Institute public key 940, and User key pair 950. Each of the cryptographic elements encoded in the composite image 1010 may be encrypted using the User's password/phrase as a key to a symmetric key encryption (e.g., blowfish).

Figure 11:
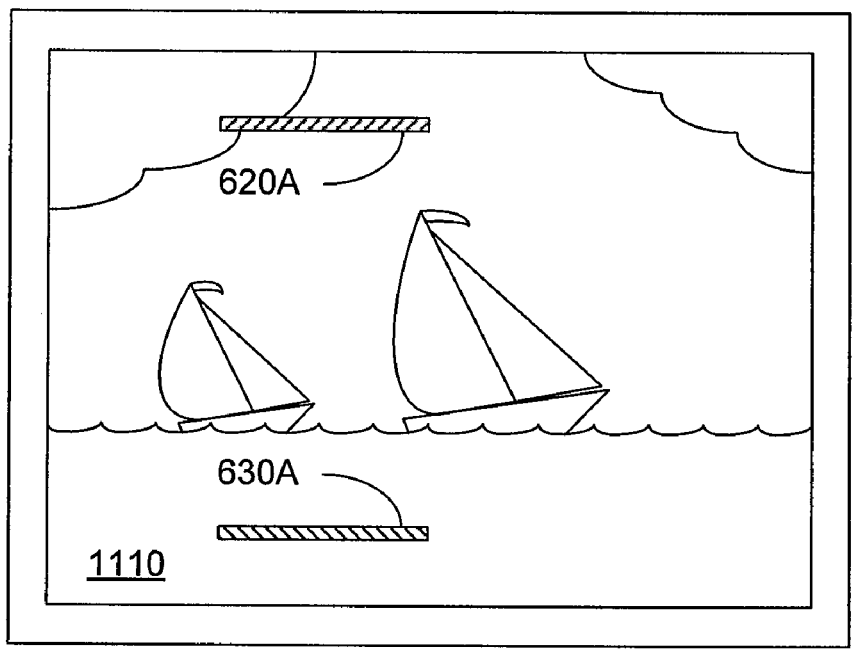
FIG. 11 is an illustration of a composite image formed from the first image portion of FIG. 6A and the second image portion of FIG. 7B according to an embodiment of the present invention.
Figure 12:
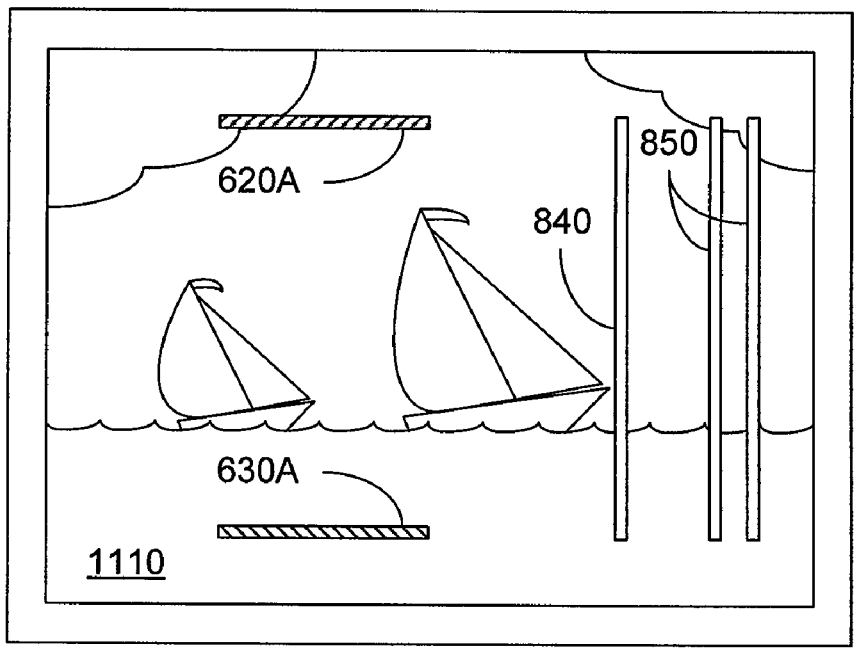
FIG. 12 is an illustration of the composite image of FIG. 11 including blanked key regions according to an embodiment of the present invention.

One skilled in the art would understand that an encoded composite image 1010 may also be generated by performing the blocks of FIG. 3 in other orders. For example, the second image data portion 710B may be combined with the first image User portion 610A before blanking out key regions and encoding keys. FIG. 11 is an illustration of a composite image 1110 formed from the first image User portion 610A of FIG. 6A and the second image data portion 710B of FIG. 7B according to an embodiment of the present invention. Key regions are blanked out of the right-hand data portion of the composite image 1110. FIG. 12 is an illustration of the composite image 1110 of FIG. 11 including blanked key regions 840 and 850 according to an embodiment of the present invention. In the embodiment of FIG. 12, the first key region 840 is associated with the Institution public key and two additional regions 850 are associated with the User key pair. Once the designated key regions 840 and 850 are blanked out, the encrypted Institution public key and User key pair may be encoded in their respective key regions to form the encoded composite image 1010 of FIG. 10.

Referring now to FIG. 1, in one embodiment the encoded composite image 1010 is provided 120 to User 180 by Institution 190. The User 180 retains the encoded composite image 1010 as a User key image 1000, which includes one half of the shared credential 500 used for authentication. User 180 may then acknowledge 125 receipt of the composite image 1010. In other embodiments, the Institution 190 may only provide 120 User image portion 610A (FIG. 6), along with the User key pair, to the User 180 for use as a User key image.

After receipt of the User key image 1000, User 180 may download 130 and install a browser plug-in used during an authentication session utilizing the User key image 1000. The plug-in may provide for marshalling the User key image 1000, or other key elements, into the HTTPS stream in the correct order to accomplish the authentication. Web browsers such as, but not limited to, Internet Explorer and Mozilla Firefox have published application program interfaces (APIs) that may be utilized by the plug-in to accomplish this purpose.

The Institution retains the Institution portion 610B of FIG. 6, which includes the other portions of the encoded User digital signature 620B and the encoded Institute digital signature 630B. The portion 610B is used as the Institution key image 600, which is the second half of the shared credential 500. The Institution key image 600 may be stored by the Institution 190 in a database for later retrieval during the authentication session. A database application used for indexing, storage and retrieval may include a commercial database such as, but not limited to, Oracle as its basis. The index for each key image pair may be a cryptographic hash such as, but not limited to, SHA-1 or MD5 of the User key image 1000 (FIG. 10) or the User portion 610A of the first image 410. The hash can be used to provide an index for the database to retrieve the key image information for use during the authentication session. In other embodiments, the index may be encoded in the data portion 710B of the second image.

Figure 13:
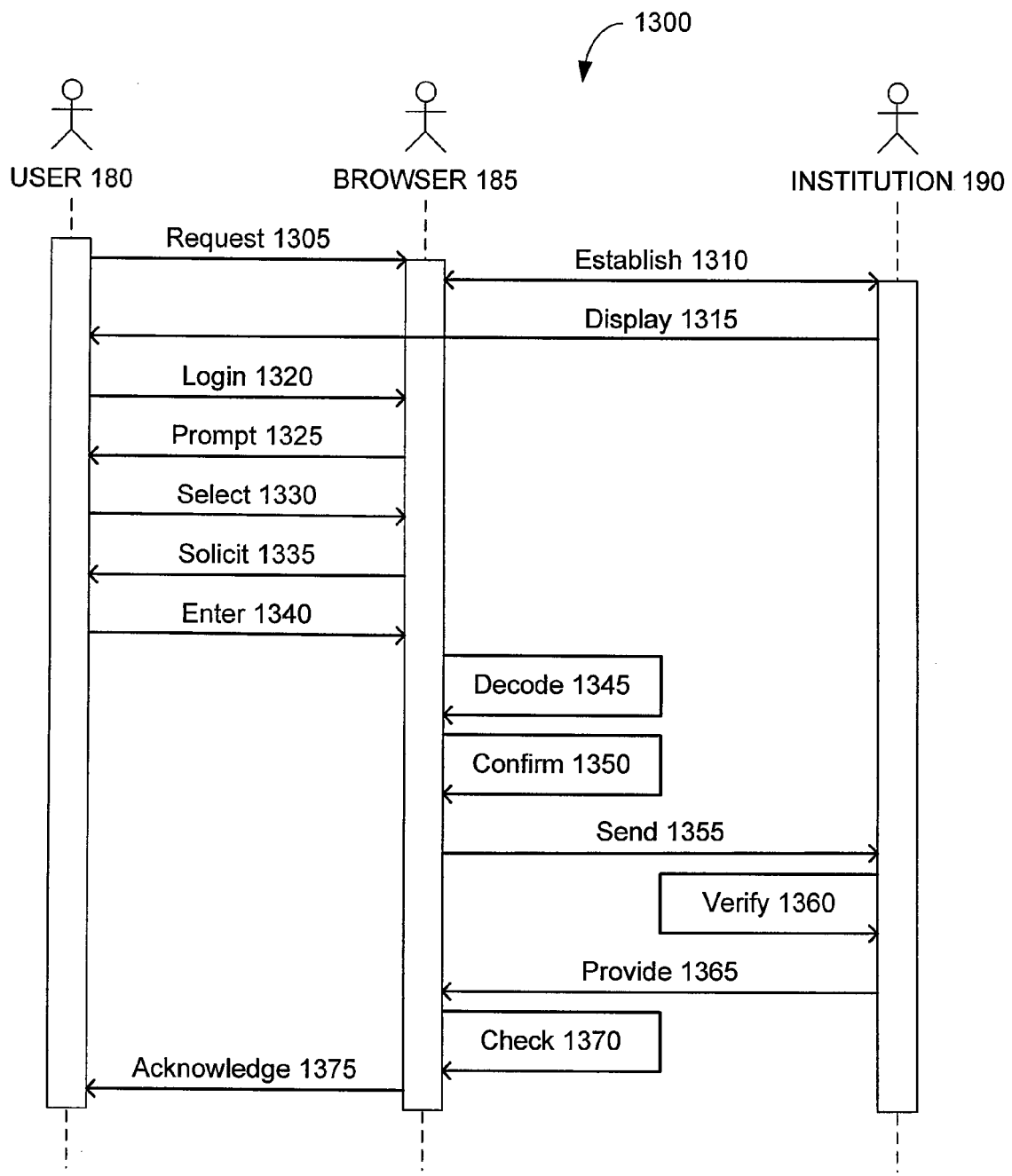
FIG. 13 is an illustration of an authentication session utilizing the key image established using the method of FIG. 1 according to an embodiment of the present invention.

FIG. 13 is an illustration of an authentication session 1300 utilizing the key image established using the method of FIG. 1 according to an embodiment of the present invention. In one embodiment, among others, mutual authentication 1300 is initiated by a request 1305 from User 180 to establish 1310 a secure link with an Institution 190 over a digital communication network. A web browser 185 contacts the Institution 190 via the Internet, or other network connection, to establish 1310 a HTTPS/SSL session. Alternatively, out of band communication such as, but not limited to, a TLS encrypted socket connection may be used.

The web server of the Institution 190 transmits one or more web pages to the web browser 185. These pages may contain various elements including one that triggers the web browser 185 to display 1315 a login web page of the Institution 190 to the User 180. The transmission may also include the public key of the Institution's web server. The login page displayed 1315 by the web browser 185 prompts the User 180 to login 1320. In one embodiment, the User 180 may login 1320 by selecting a login button on the web page. In other embodiments, a pull-down selection menu may be used. Another embodiment may automatically login 1320 the User 180. In response to the User's login 1320, the browser 185 prompts 1325 the User 180 to select 1330 a key image or other key element such as, but not limited to, a key audio clip and a key video clip.

The User 180 then selects 1330 a User key image associated with the Institution 190. FIG. 10 is an illustration of a User key image 1000, which is encoded with portions of the User and Institute signatures 620A and 630A, respectively. In the embodiment of FIG. 10, the User key image 1000 is also encoded with an Institute public key 940 and a User key pair 950 including public and private keys. In other embodiments, the User 180 may select 1330 the User portion 610A (FIG. 6A) of the first image 410 and separately provide User and/or Institution keys associated with the User portion 610A.

In one embodiment, among others, the User 180 may select 1330 the User key image 1000 from a group of images displayed on the web page. In another embodiment, the User 180 may select 1330 a key image file, which may be located either locally and/or remotely, from a listing of files. With the key image 1000 being visually indistinguishable from the original digital image 210 (FIG. 2) from which it was generated, offering a group of selections provides additional security based on knowledge of the appropriate selection. The images may be stored locally in a processor system, remotely on another Internet server, or on other computer readable medium. Storage of the key image on an Internet server or other portable computer readable medium enables the User 180 to use other computers or processor systems to provide for secure transactions with the Institution.

Once the User key image 1000 is selected 1330, the User 180 may be solicited 1335 to enter 1340 a passkey (e.g., password or phrase) to unlock the cryptographic elements stored in the User key image 1000. The passkey can be used to decode 1345 an Institute public key and/or a User key pair encoded in their respective key regions 940 and 950 of the User key image 1000. A symmetric encryption code such as, but not limited to, RSA may be used during decoding 1345. A key is extracted from the encoded key region associated with the key and decrypted using the passkey. The decrypted Institute public key is used to initially confirm 1350 the identity of the User 180 by comparing it to the transmitted public key of the Institution's web server. Confirmation of the Institute public key can also be used to verify the security of a SSL link. Optionally, biometric information such as, but not limited to, keystroke and/or key-hit information describing the keyboard input pattern of the User 180 while entering 1340 the passkey may be employed as another factor in the authentication session 1300. In other embodiments, an identifying factor of the enrolling device may be extracted from the data portion 710B of the User key image 1000 and used to verify that the user is logging-in from a trusted device. This information may be used to node-lock a User and/or to advise a fraud detection engine as evidence of the need for heightened suspicion.

If confirmation 1350 of the Institution public key fails, this may be an indication of a man-in-the-middle attack where an unauthorized third party has gained access to the transmissions between two parties without either party knowing about the breach. For example, a hacker may reroute a domain name system (DNS) to a phishing site, which mimics the web site of Institution 190, for gathering personal information from the User 180. When the man-in-the-middle (MITM) occurs, the Server public key does not match the encoded Institution public key. In that case, confirmation 1350 will fail and no further information is transmitted. Man-in-the-browser attacks seek to watch web activity until a known payment page is contacted (e.g., Funds Transfer at a Bank). The rogue browser extension changes transaction information in an attempt to re-route funds to an unauthorized third party. In one embodiment, among others, the browser plug-in appends a digital signature for a submitted transaction to verify the integrity of the transaction. This signature is computed using the private key contained in the User's key image. This allows the Institution to detect man-in-the-browser attacks and deny fraudulently manipulated transactions. In other embodiments, a fraud ticket may be transmitted to a bank, clearinghouse, or law enforcement entity for further action. Other embodiments may also display a phishing warning to the User 180 as an indication of a potential breach.

If the confirmation 1350 of the Institution public key is successful, browser 185 sends 1355 the User key image 1000 to Institution 190. The passkey may also be sent. In other embodiments, the browser 185 may redact the User portion 610A (FIG. 6A) from the User key image 1000 before sending 1355 the User portion 610A. The redacted portion 610A, which includes parts of the User signature 620A and Institute signature 630A, may then be sent 1355 to Institution 190 for verification 1360 of its encoded digital signature. The User public and/or private keys may also be sent.

In another embodiment, the partial signatures 620A and 630A encoded in User portion 610A may have also been encrypted using the passkey. In this embodiment, the browser plug-in uses the passkey to decrypt the parts of the User signature 620A and Institute signature 630A before transmitting the User portion 610A to the Institution 190.

Figure 14:
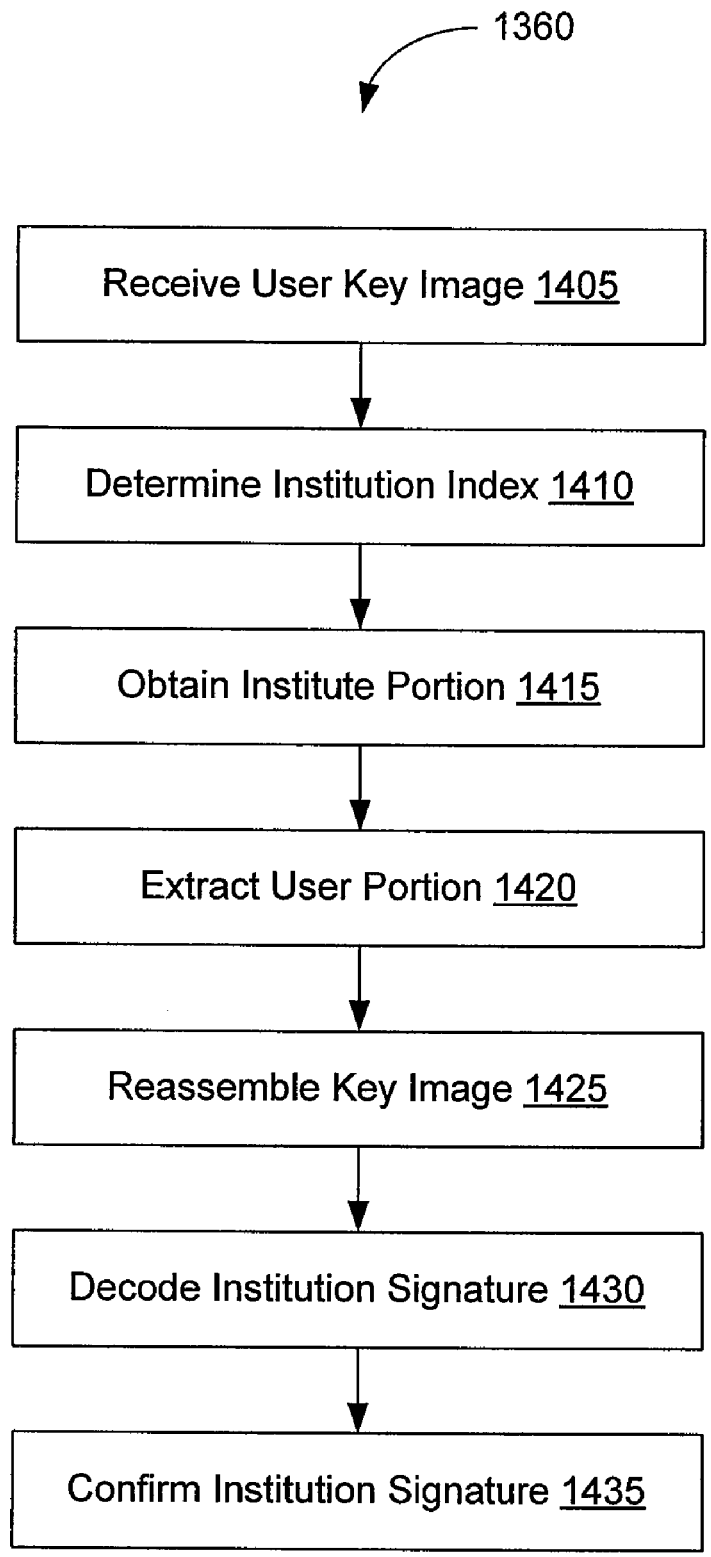
FIG. 14 is a flow chart of one example method used to verify a digital signature during the authentication session of FIG. 13 according to an embodiment of the present invention.

FIG. 14 is a flow chart of one example method used to verify 1360 a digital signature during the authentication session 1300 of FIG. 13 according to an embodiment of the present invention. In block 1405, the Institution 190 receives the selected User key image 1000 from browser 185. The index to locate the Institution Portion 610B (FIG. 6B) is determined in block 1410. In one embodiment, the index may be determined from a lookup table based upon a User identification number. In another embodiment, a cryptographic hash of the User key image 1000 may be used to determine the index locating the Institution portion 610B in the database. In other embodiments, the Institution 190 may extract an index encoded in the User key image 1000. The Institute Portion 610B can be obtained in block 1415 from a database based upon the index.

In block 1420, the User portion 610A (FIG. 6A) is extracted from the received User key image 1000. In other embodiments, the browser 185 may only send 1355 the User portion 610A to the Institution 190 for verification 1360. In those embodiments, block 1420 is not performed because the User portion 610A is not included in the User key image 1000. Also, in some embodiments, the index may be obtained in block 1410 using a hash of the User portion 610A or other portion of the User key image 1000.

In block 1425, the User portion 610A and the Institution Portion 610B are reassembled to produce the shared credential 500 of FIG. 5. The encoded Institution digital signature 530 is decoded from the shared credential 500 in block 1430. The validity of the decoded signature is confirmed in block 1435 using the Institution private key. If the Institution signature is not correct, the authentication session 1300 ends and an error message may be sent back to the browser 185 and/or the User 180. In alternative embodiments, reassembly of the shared credential 500 and verification of the Institution digital signature may be carried out by an authorized third party under Institution 190 supervision and/or contract.

Referring now to FIG. 13, when verification 1360 of the encoded Institution signature 530 is successful, the Institution 190 provides 1365 the Institution key image 600 (including Institution portion 610B) to the browser 185 to check 1370 the User digital signature utilizing the public key of User 180. The User portion 610A, separated from the User key image 1000, is reassembled with the Institution portion 610B to produce the shared credential 500 (FIG. 5) with the encoded User digital signature 520. The encoded User digital signature 520 is extracted and its validity checked 1370 using the User public key.

Upon authentication of the User digital signature, browser 185 acknowledges 1375 successful completion of the authentication session 1300 to User 180. This acknowledgement may include displaying the Institution key image 610B or the reassembled shared credential 500 to User 180. In other embodiments, an additional level of authentication may be provided by prompting the User 180 for a response such as, but not limited to, asking a question about the displayed image. For example, User 180 may submit an image of his house to generate the key image pair. A corresponding question may be generated by the Institution 190 before acknowledgement 1375 such as "What is in this picture?" The proper response could be "My Family Castle and Fortress" or any other appropriate word or phrase. This provides one more layer of security for the User (or Client) 180 and the Institution 190. Questions and Answers would be predetermined during the initial establishment of the key image pair, such as during method 100 of FIG. 1.

Transfer of personal information between the authenticated parties (i.e., User 180 and Institution 190) may then proceed. Expanded transactions or communications including additional parties may also be secured using additional key images encoded with digital signatures associated with each additional party. Multiple key images may be generated from one or more original images. Each party can provide their key image for assembly with one or more of the key images of the other parties. Once assembled, each party can verify their digital signature using their public key. After authentication of the party signatures, multiparty communications or transactions can proceed. Alternatively, one or more parties can act as a "communication hub" by authenticating each party's key image individually. Communication or transactions would then flow through the common party without needing cross-authentication between all of the parties.

Figure 15:
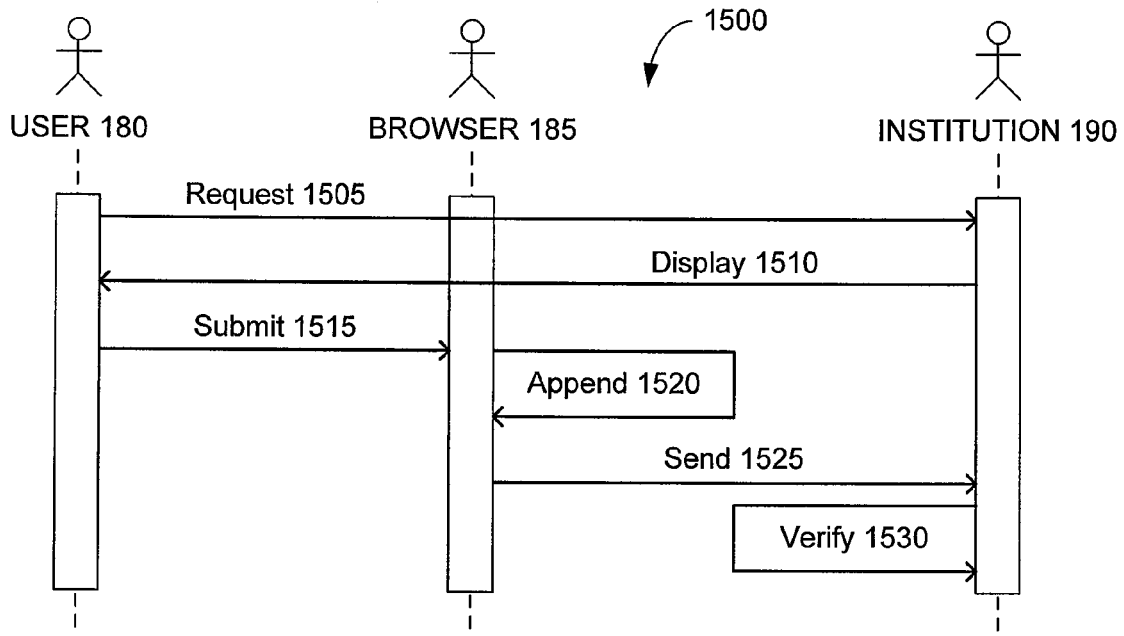
FIG. 15 is an illustration of a transaction scenario after successful completion of the authentication session of FIG. 13 according to an embodiment of the present invention.

FIG. 15 is an illustration of a transaction scenario 1500 after successful completion of the authentication session 1300 of FIG. 13 according to an embodiment of the present invention. The User 180 requests 1505 that a transaction be carried out by the Institution 190. Examples of transactions include, but not limited to, on-line bill payment, funds transfer, and check generation. In response to the request 1505, a transaction page is displayed 1510 to the User 180.

The User 180 selects a desired action and/or fills in form information before submitting 1515 the transaction for processing by the Institution 190. In response to the submission 1515, the browser 185 computes a digital signature for the transaction and appends 1520 the signature to the transaction in a hidden field in the form. In one embodiment, the digital signature is computed using a hash of the transaction form, which is encrypted using the User private key of the key pair 950 encoded in the User key image 1000 (FIG. 10). The browser 185 then sends 1525 the transaction with the digital signature to the Institution 190 for processing. The Institution 190 verifies 1530 the digital signature to ensure transaction integrity before processing the transaction. Verification 1530 utilizes the User public key of the key pair 950 encoded in the User key image 1000 to confirm integrity.

Figure 16:
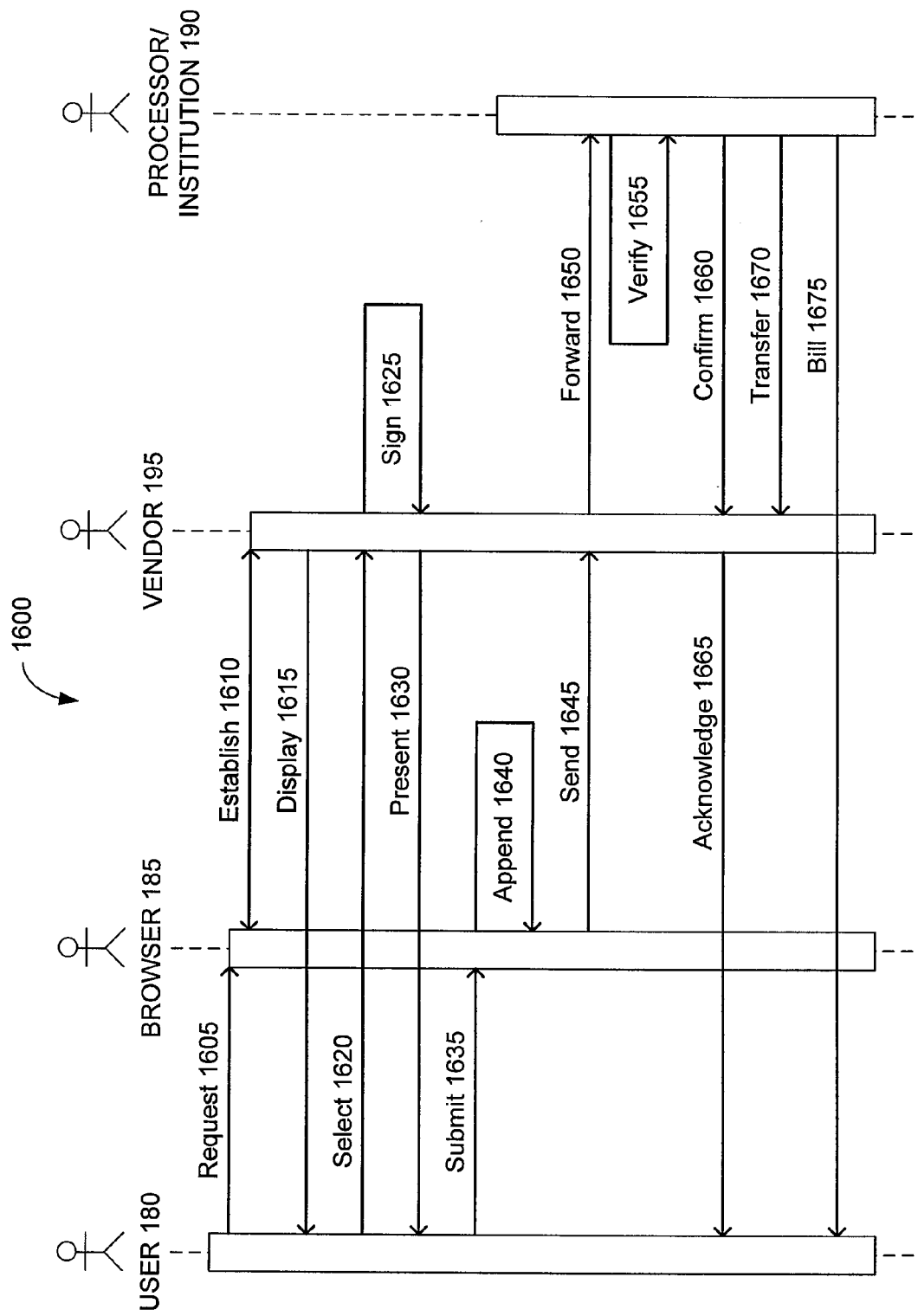
FIG. 16 is an illustration of a third-party transaction scenario utilizing the key image established using the method of FIG. 1 according to an embodiment of the present invention.

FIG. 16 is an illustration of a third-party transaction scenario 1600 utilizing the key image established using the method of FIG. 1 according to an embodiment of the present invention. Initially, User 180 requests 1605 access to a web site of Vendor 195. In response to the request 1605, web browser 185 contacts the Vendor 195 web server via the Internet, or other network connection, to establish 1610 a HTTPS/SSL session. The web server of the Vendor 195 transmits one or more web pages to the web browser 185. These pages may contain various elements including one that triggers the web browser 185 to display 1615 a login web page of the Vendor 195 to the User 180. The same procedure illustrated in FIG. 13 and discussed in relation to User 180 and Institution 190 may be used to mutually authenticate User 180 and Vendor 195. Alternatively, no login may be necessary to access content on the web site of Vendor 195.

The User 180 may then select 1620 a transaction to be completed. Examples include, but are not limited to, an e-commerce check out and an on-line installment payment. The Vendor 195 signs 1625 the transaction using the Vendor's keys and presents the signed transaction to the User 180 for payment. In response, the User 180 submits 1635 the signed transaction and the form of payment including a User key image associated with the form of payment (or a portion of a shared credential derived from the User key image). The User key image would have been established with the Processor/Institution 190 associated with the form of payment using a method such as previously described in relation to FIGS. 1 and 3. In one embodiment, the User key image is based upon an image of the credit card used for payment. The User key image includes an encoded part of the User's digital signature and an encoded part of the digital signature of the Processor/Institution 190. In addition, the User key image is encoded with the User's private and public key pair.

Before sending the transaction to the Vendor 195, the browser 185 computes a digital signature for the transaction and appends 1640 the signature to the transaction in a hidden field. In one embodiment, the digital signature is computed using a hash of the transaction form, which is encrypted using the User private key of the key pair encoded in the User key image. In other embodiments, the hash of the transaction may include the vendor signature for the transaction. The browser 185 then sends 1645 the transaction with both digital signatures to the Vendor 195 for processing by the Processor/Institution 190. The Vendor 195 forwards 1650 the signed transaction to the Processor/Institution 190. In another embodiment, the browser 185 also sends 1645 the User portion of the shared credential to the Vendor 195, who forwards 1650 the User portion of the shared credential to the Processor/Institution 190. In other embodiments, the User key image is sent 1645 and forwarded 1650.

The Processor/Institution 190 verifies 1655 the appended digital signatures to ensure transaction integrity. Verification 1655 of the User digital signature, which is appended to the transaction, may utilize a User public key that is stored in a database. Alternatively, Processor/Institution 190 may use the User public key of the key pair encoded in the User key image. In other embodiments, the Processor/Institution 190 may also verify the Institution signature encoded in the submitted User key image using the method of FIG. 14.

Upon successful verification 1655, Processor/Institution 190 confirms 1660 the transaction to Vendor 195. Vendor 195 may then acknowledge 1665 receipt of the confirmation 1660 to the User 180. Processor/Institution 190 processes the transaction by transferring 1670 the transaction funds to the Vendor 195 and billing 1675 or debiting the account of the User 180.

Figure 17:
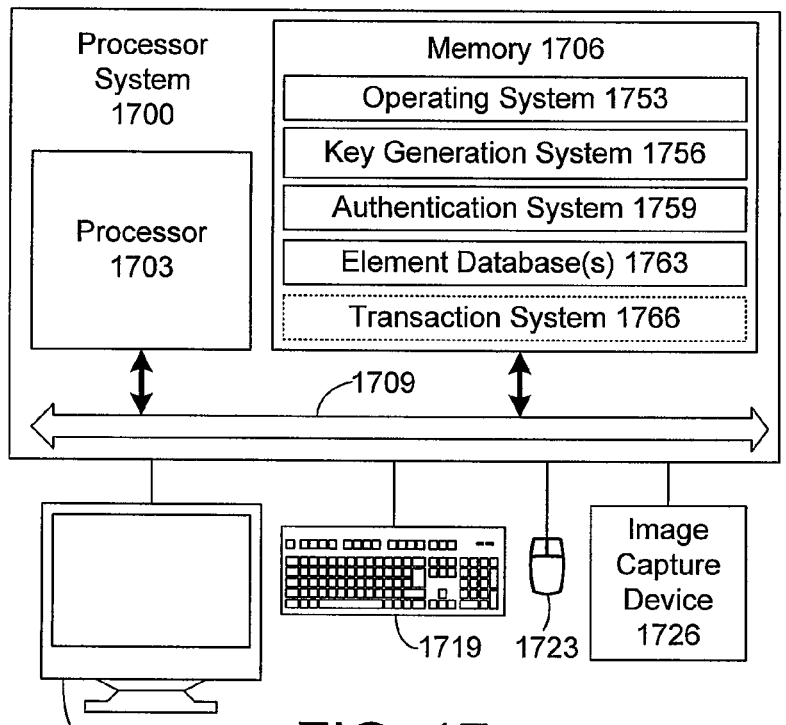
FIG. 17 is a schematic block diagram of one example of a system employed to establish a key image and to perform authentication utilizing the key image according to an embodiment of the present invention.

Referring next to FIG. 17, shown is a schematic block diagram of one example of a system employed to generate a key image and to perform authentication utilizing the key image according to the various embodiments as set forth above. As shown, a processor system 1700 is provided that includes a processor 1703 and a memory 1706, both of which are coupled to a local interface 1709. The local interface 1709 may be, for example, a data bus with an accompanying control/address bus as can be appreciated by those with ordinary skill in the art. The processor system 1700 may comprise, for example, a computer system such as a server, desktop computer, laptop, personal digital assistant, or other system with like capability.

Coupled to the processor system 1700 are various peripheral devices such as, for example, a display device 1713, a keyboard 1719, and a mouse 1723. In addition, other peripheral devices that allow for the capture of various elements may be coupled to the processor system 1700 such as, for example, an image capture device 1726, an audio capture device, or combinations thereof. The image capture device 1726 may comprise, for example, a digital camera, video camera or other such device that generates one or more images to be utilized as described above. Also, the audio capture device may comprise, for example, a tape recorder, a video recorder, DVD recorder, or other recording device as can be appreciated.

Stored in the memory 1706 and executed by the processor 1703 are various components that provide various functionality according to the various embodiments of the present invention. In the example embodiment shown, stored in the memory 1706 is an operating system 1753, a key generation system 1756, an authentication system 1759. A browser may also be stored in the memory 1706. In addition, stored in the memory 1706 are various element databases 1763. The memory 1706 may also store a transaction system 1766. The element databases 1763 may be accessed by the other systems as needed. The element databases 1763 may comprise digital images such as the image 210 (FIG. 2) or other digital images as can be appreciated. The element databases 1763 may also comprise, for example, digital video clips or digital audio clips, etc.

The key generation system 1756 is executed by the processor 1703 in order to generate key images (or key elements) as described previously. The key generation system 1756 may utilize images or other elements stored in an element database 1763. Images in the database 1763 may be presented to a User 180 for selected as the original image used to generate a key image pair. The element databases 1763 may also be used to store the key images produced by the key generation system. In addition, the key generation system 1756 may include other functionality not discussed herein.

The authentication system 1759 is executed by the processor 1703 in order to establish secure links by authenticating parties using key images (or key elements) as described previously. The authentication system 1759 may utilize key images or other key elements stored in an element database 1763. Key images in the database 1763 may be used to authenticate digital signatures encoded in the key images as described previously. In addition, the authentication system 1759 may include other functionality not discussed herein.

The transaction system 1766 may be an optional component that may or may not be executed to process transactions that are verified using the generated key images or elements produced by the key generation system 1756 as previously described in relation to FIG. 15. In addition, the transaction system 1766 may include other functionality not discussed herein.

A number of software components are stored in the memory 1706 and are executable by the processor 1703. In this respect, the term "executable" means a program file that is in a form that can ultimately be run by the processor 1703. Examples of executable programs may be, for example, a compiled program that can be translated into machine code in a format that can be loaded into a random access portion of the memory 1706 and run by the processor 1703, or source code that may be expressed in proper format such as object code that is capable of being loaded into a of random access portion of the memory 1706 and executed by the processor 1703, etc. An executable program may be stored in any portion or component of the memory 1706 including, for example, random access memory, read-only memory, a hard drive, compact disk (CD), floppy disk, or other memory components.

The memory 1706 is defined herein as both volatile and nonvolatile memory and data storage components. Volatile components are those that do not retain data values upon loss of power. Nonvolatile components are those that retain data upon a loss of power. Thus, the memory 1706 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

The processor 1703 may represent multiple processors and the memory 1706 may represent multiple memories that operate in parallel. In such a case, the local interface 1709 may be an appropriate network that facilitates communication between any two of the multiple processors, between any processor and any one of the memories, or between any two of the memories etc. The processor 1703 may be of electrical, optical, or molecular construction, or of some other construction as can be appreciated by those with ordinary skill in the art.

The operating system 1753 is executed to control the allocation and usage of hardware resources such as the memory, processing time and peripheral devices in the processor system 1700. In this manner, the operating system 1753 serves as the foundation on which applications depend as is generally known by those with ordinary skill in the art.

The previous discussion relating to the illustrations and flow charts of FIGS. 1, 3, and 13-16 describe various examples of functionality of the various systems as set forth above. For each illustration and flow chart, the functionality may implemented, for example, using an object oriented design. If such is the case, then each action or block may be considered as representing functionality that may be implemented in one or more methods that are encapsulated in one or more objects. The various functionality depicted in the illustrations and flow charts described herein may be implemented using any one of a number of programming languages such as, for example, C, C++, C#, JAVA, Perl, Python, Flash, or other programming languages.

Referring to FIG. 3, which was previously discussed, shown is a flow chart that can provide one example of the operation of the key generation system 1756 to generate a key image pair according to an embodiment of the present invention. Alternatively, the flow chart of FIG. 3 may be viewed as depicting steps of an example of a method implemented in the processor system 1700 to generate a key image pair according to an embodiment of the present invention. Similarly, FIG. 1 is an illustration of actions, which were previously discussed, that can provide examples of operations of the key generation system 1756 according to an embodiment of the present invention. Alternatively, the illustration of FIG. 1 may be viewed as depicting steps of an example of a method implemented in the processor system 1700 according to an embodiment of the present invention.

Referring next to FIG. 14, shown is a flow chart that provides one example of the operation of the authentication system 1759 according to an embodiment of the present invention. Alternatively, the flow chart of FIG. 14 may be viewed as depicting steps of an example of a method implemented in the processor system 1700 to verify a digital signature encoded in a key image during an authentication session according to an embodiment of the present invention. Similarly, FIG. 13 is an illustration of actions, which were previously discussed, that can provide examples of operations of the authentication system 1756 according to an embodiment of the present invention. Alternatively, the illustration of FIG. 13 may be viewed as depicting steps of an example of a method implemented in the processor system 1700 according to an embodiment of the present invention.

Referring next to FIGS. 15 and 16, shown are illustrations of actions, which were previously discussed, that can provide examples of operations of the transaction system 1766 to verify transaction integrity according to an embodiment of the present invention. Alternatively, the illustrations of FIGS. 15 and 16 may be viewed as depicting steps of an example of a method implemented in the processor system 1700 to verify transaction integrity according to an embodiment of the present invention.

Although the key generation system 1756, authentication system 1759, and/or the transaction system 1766 are described as being embodied in software or code executed by general purpose hardware as discussed above, as an alternative the same may also be embodied in dedicated hardware or a combination of software/general purpose hardware and dedicated hardware. If embodied in dedicated hardware, each of the key generation system 1756, authentication system 1759, and/or the transaction system 1766 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The illustrations and flow charts of FIGS. 1, 3, and 13-16 show the architecture, functionality, and operation of an implementation of the key generation system 1756, authentication system 1759, and/or the transaction system 1766. If embodied in software, each block and action may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the illustrations and flow charts of FIGS. 1, 3, and 13-16 show a specific order of execution, it is understood that the order of execution may differ from that which is depicted. For example, the order of execution of two or more blocks or actions may be scrambled relative to the order shown. Also, two or more blocks or actions shown in succession in FIGS. 1, 3, and 13-16 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where each of the key generation system 1756, authentication system 1759, and/or the transaction system 1766 may comprise software or code, each can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the key generation system 1756, authentication system 1759, and/or the transaction system 1766 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Another embodiment, among others, includes a method comprising: encoding a first party digital signature in a first signature region of a first image and encoding a second party digital signature in a second signature region of the first image to produce a first encoded image; and separating the first encoded image into a first portion and a second portion, the first portion including a first part of the first party digital signature and a first part of the second party digital signature and the second portion including a second part of the first party digital signature and a second part of the second party digital signature. The method may further comprise generating the first party digital signature from the first image before encoding. The method may further comprise generating the first party digital signature from the first image before encoding. Generating the first party digital signature may comprise computing a hash from the first image and encrypting the hash using a first party private key. The method may further comprise generating the second party digital signature by encrypting the hash using a second party private key. The method may further comprise blanking out the first signature region of the first image before generating the first party digital signature. The method may further comprise blanking out the second signature region of the first image before generating the first party digital signature. The method may further comprise providing the first portion of the first encoded image to a first party.

The method may further comprise: duplicating an original image to produce the first image for encoding and a second image; separating the second image into a first portion and a second portion, the first portion of the second image being substantially similar to the first portion of the encoded image and the second portion of the second image being substantially similar to the second portion of the encoded image; and combining the first portion of the first encoded image with the second portion of the second image to form a first party combined image substantially similar to the received image. The method may further comprise providing the first party combined image to a first party. The method may further comprise encoding a first party private key into the second portion of the second image. The method may further comprise blanking out a first key region of the second portion of the second image before encoding the first party private key in the blanked out first key region. The first party private key may be encoded into the second portion of the second image before combining with the first portion of the first encoded image. The first party private key may be encrypted using a first party password before encoding. The method may further comprise encoding a first party public key into the second portion of the second image. The method may further comprise encoding a second party public key into the second portion of the second image. The original image may selected by a first party. The method may further comprise reformatting the original image before duplicating. The method may further comprise generating a first party private key and a first party public key from the original image.

Another embodiment, among others, includes a system comprising: a processor circuit having a processor and a memory and a key generation system stored in the memory and executable by the processor, where the key generation system comprises: logic configured to encode a first party digital signature in a first signature region of a first image and encode a second party digital signature in a second signature region of the first image to produce a first encoded image and logic configured to separate the first encoded image into a first portion and a second portion, the first portion including a first part of the first party digital signature and a first part of the second party digital signature and the second portion including a second part of the first party digital signature and a second part of the second party digital signature. The key generation system may further comprise logic configured to generate the first party digital signature from the first image before encoding. The logic configured to generate the first party digital signature may comprise logic configured to compute a hash from the first image and logic configured to encrypt the hash using a first party private key. The key generation system may further comprise logic configured to generate the second party digital signature by encrypting the hash using a second party private key. The key generation system may further comprise logic configured to blank out the first signature region of the first image before generating the first party digital signature. The key generation system may further comprise logic configured to blank out the second signature region of the first image before generating the first party digital signature. The key generation system may further comprise logic configured to provide the first portion of the first encoded image to a first party.

The key generation system may further comprise: logic configured to duplicate an original image to produce the first image for encoding and a second image; logic configured to separate the second image into a first portion and a second portion, the first portion of the second image being substantially similar to the first portion of the encoded image and the second portion of the second image being substantially similar to the second portion of the encoded image; and logic configured to combine the first portion of the first encoded image with the second portion of the second image to form a first party combined image substantially similar to the received image. The key generation system may further comprise logic configured to provide the first party combined image to a first party. The key generation system may further comprise logic configured to encode a first party private key into the second portion of the second image. The key generation system may further comprise logic configured to blank out a first key region of the second portion of the second image before encoding the first party private key in the blanked out first key region. The first party private key may be encoded into the second portion of the second image before combining with the first portion of the first encoded image. The first party private key may be encrypted using a first party password before encoding. The key generation system may further comprise logic configured to encode a first party public key into the second portion of the second image. The key generation system may further comprise logic configured to encode a second party public key into the second portion of the second image. The original image may be selected by a first party. The key generation system may further comprise logic configured to reformat the original image before duplicating. The key generation system may further comprise logic configured to generate a first party private key and a first party public key from the original image. The key generation system may further comprise logic configured to store the second portion of the first encoded image in the memory. The system may further comprise a database stored in the memory, the database including the second portion of the first encoded image.

Another embodiment, among others, includes a system comprising means for encoding a first party digital signature in a first signature region of a first image and encoding a second party digital signature in a second signature region of the first image to produce a first encoded image and means for separating the first encoded image into a first portion and a second portion, the first portion including a first part of the first party digital signature and a first part of the second party digital signature and the second portion including a second part of the first party digital signature and a second part of the second party digital signature. The system may further comprise means for generating the first party digital signature from the first image before encoding. The means for generating the first party digital signature may comprise means for computing a hash from the first image and means for encrypting the hash using a first party private key. The system may further comprise means for generating the second party digital signature by encrypting the hash using a second party private key. The system may further comprise means for blanking out the first signature region of the first image before generating the first party digital signature. The system may further comprise means for blanking out the second signature region of the first image before generating the first party digital signature. The system may further comprise means for providing the first portion of the first encoded image to a first party.

The system may further comprise: means for duplicating an original image to produce the first image for encoding and a second image; means for separating the second image into a first portion and a second portion, the first portion of the second image being substantially similar to the first portion of the encoded image and the second portion of the second image being substantially similar to the second portion of the encoded image; and means for combining the first portion of the first encoded image with the second portion of the second image to form a first party combined image substantially similar to the received image. The system may further comprise means for providing the first party combined image to a first party. The system may further comprise means for encoding a first party private key into the second portion of the second image. The system may further comprise means for blanking out a first key region of the second portion of the second image before encoding the first party private key in the blanked out first key region. The first party private key may be encoded into the second portion of the second image before combining with the first portion of the first encoded image. The first party private key may be encrypted using a first party password before encoding. The system may further comprise means for encoding a first party public key into the second portion of the second image. The system may further comprise means for encoding a second party public key into the second portion of the second image. The original image may be selected by a first party. The system may further comprise means for reformatting the original image before duplicating. The system may further comprise means for generating a first party private key and a first party public key from the original image. The system may further comprise means for storing the second portion of the first encoded image.

Another embodiment, among others, includes a program embodied in a computer-readable medium and executable by a computer system comprising code configured to encode a first party digital signature in a first signature region of a first image and encode a second party digital signature in a second signature region of the first image to produce a first encoded image and code configured to separate the first encoded image into a first portion and a second portion, the first portion including a first part of the first party digital signature and a first part of the second party digital signature and the second portion including a second part of the first party digital signature and a second part of the second party digital signature. The program embodied in the computer-readable medium may further comprise code configured to generate the first party digital signature from the first image before encoding. The code configured to generate the first party digital signature may comprise code configured to compute a hash from the first image and code configured to encrypt the hash using a first party private key. The program embodied in the computer-readable medium may further comprise code configured to generate the second party digital signature by encrypting the hash using a second party private key. The program embodied in the computer-readable medium may further comprise code configured to blank out the first signature region of the first image before generating the first party digital signature. The program embodied in the computer-readable medium may further comprise code configured to blank out the second signature region of the first image before generating the first party digital signature. The program embodied in the computer-readable medium may further comprise code configured to provide the first portion of the first encoded image to a first party.

The program embodied in the computer-readable medium may further comprise: code configured to duplicate an original image to produce the first image for encoding and a second image; code configured to separate the second image into a first portion and a second portion, the first portion of the second image being substantially similar to the first portion of the encoded image and the second portion of the second image being substantially similar to the second portion of the encoded image; and code configured to combine the first portion of the first encoded image with the second portion of the second image to form a first party combined image substantially similar to the received image. The program embodied in the computer-readable medium may further comprise code configured to provide the first party combined image to a first party. The program embodied in the computer-readable medium may further comprise code configured to encode a first party private key into the second portion of the second image. The program embodied in the computer-readable medium may further comprise code configured to blank out a first key region of the second portion of the second image before encoding the first party private key in the blanked out first key region. The first party private key may be encoded into the second portion of the second image before combining with the first portion of the first encoded image. The first party private key may be encrypted using a first party password before encoding. The program embodied in the computer-readable medium may further comprise code configured to encode a first party public key into the second portion of the second image. The program embodied in the computer-readable medium may further comprise code configured to encode a second party public key into the second portion of the second image. The original image may be selected by a first party. The program embodied in the computer-readable medium may further comprise code configured to reformat the original image before duplicating. The program embodied in the computer-readable medium may further comprise code configured to generate a first party private key and a first party public key from the original image. The program embodied in the computer-readable medium may further comprise code configured to store a first party private key and a first party public key from the original image in the memory.

Another embodiment, among others, includes a method comprising: encoding N digital signatures in N corresponding signature regions of a first image, each digital signature associated with at least one of N parties; and separating the first encoded image into M portions, each portion including a first part of at least one of the N digital signatures. The method may further comprise providing one of the M portions to the party associated with a digital signature included in the one of the M portions. The method may further comprise: duplicating an original image to produce the first image for encoding and a second image; separating the second image into M portions, each of the M portions of the second image being substantially similar to the corresponding portion of the first encoded image; and combining a first portion of the first encoded image including the first part of a first of the N digital signatures with a second portion of the second image, the second portion of the second image corresponding to a second portion of the first encoded image including a second part of the first digital signature. The first portion of the first encoded image may include a first part of a second of the N digital signatures and the second portion of the first encoded image may include a second part of the second digital signature. The first portion of the first encoded image may include a first part of a third of the N digital signatures and the second portion of the first encoded image may include a second part of the third digital signature.

The method may further comprise combining the first portion of the first encoded image and the second part of the second image with a third portion of the second image, the first portion of the first encoded image including a first part of a second of the N digital signatures, the third portion of the second image corresponding to a third portion of the first encoded image including a second part of the second digital signature. The method may further comprise generating at least one of the N digital signatures from the first image. Generating the at least one digital signature may comprise computing a hash from the first image and encrypting the hash using a private key associated with the at least one of the N parties associated with the digital signature. The method may further comprise blanking out the N corresponding signature regions of the first image before generating the at least one digital signature.

Another embodiment, among others, includes a system comprising a processor circuit having a processor and a memory; and a key generation system stored in the memory and executable by the processor, the key generation system comprising logic configured to encode N digital signatures in N corresponding signature regions of a first image, each digital signature associated with at least one of N parties and logic configured to separate the first encoded image into M portions, each portion including a first part of at least one of the N digital signatures. The key generation system may further comprise logic configured to provide one of the M portions to the party associated with a digital signature included in the one of the M portions. The key generation system may further comprise: logic configured to duplicate an original image to produce the first image for encoding and a second image; logic configured to separate the second image into M portions, each of the M portions of the second image being substantially similar to the corresponding portion of the first encoded image; and logic configured to combine a first portion of the first encoded image including the first part of a first of the N digital signatures with a second portion of the second image, the second portion of the second image corresponding to a second portion of the first encoded image including a second part of the first digital signature. The first portion of the first encoded image may include a first part of a second of the N digital signatures and the second portion of the first encoded image may include a second part of the second digital signature. The first portion of the first encoded image may include a first part of a third of the N digital signatures and the second portion of the first encoded image may include a second part of the third digital signature.

The key generation system may further comprise logic configured to combine the first portion of the first encoded image and the second part of the second image with a third portion of the second image, the first portion of the first encoded image including a first part of a second of the N digital signatures, the third portion of the second image corresponding to a third portion of the first encoded image including a second part of the second digital signature. The key generation system may further comprise logic configured to generate at least one of the N digital signatures from the first image. The logic configured to generate the at least one digital signature may comprise logic configured to compute a hash from the first image and logic configured to encrypt the hash using a private key associated with the at least one of the N parties associated with the digital signature. The key generation system may further comprise logic configured to blank out the N corresponding signature regions of the first image before generating the at least one digital signature. The key generation system may further comprise logic configured to store in the memory a portion of the first encoded image including a second part of at least one of the N digital signatures.

Another embodiment, among others, includes a system comprising means for encoding N digital signatures in N corresponding signature regions of a first image, each digital signature associated with at least one of N parties and means for separating the first encoded image into M portions, each portion including a first part of at least one of the N digital signatures. The system may further comprise means for providing one of the M portions to the party associated with a digital signature included in the one of the M portions. The system may further comprise: means for duplicating an original image to produce the first image for encoding and a second image; means for separating the second image into M portions, each of the M portions of the second image being substantially similar to the corresponding portion of the first encoded image; and means for combining a first portion of the first encoded image including the first part of a first of the N digital signatures with a second portion of the second image, the second portion of the second image corresponding to a second portion of the first encoded image including a second part of the first digital signature. The first portion of the first encoded image may include a first part of a second of the N digital signatures and the second portion of the first encoded image may include a second part of the second digital signature. The first portion of the first encoded image may include a first part of a third of the N digital signatures and the second portion of the first encoded image may include a second part of the third digital signature.

The system may further comprise means for combining the first portion of the first encoded image and the second part of the second image with a third portion of the second image, the first portion of the first encoded image including a first part of a second of the N digital signatures, the third portion of the second image corresponding to a third portion of the first encoded image including a second part of the second digital signature. The system may further comprise means for generating at least one of the N digital signatures from the first image. The means for generating the at least one digital signature may comprise means for computing a hash from the first image and means for encrypting the hash using a private key associated with the at least one of the N parties associated with the digital signature. The system may further comprise means for blanking out the N corresponding signature regions of the first image before generating the at least one digital signature. The system may further comprise means for storing a portion of the first encoded image including a second part of at least one of the N digital signatures.

Another embodiment, among others, includes a program embodied in a computer-readable medium and executable by a computer system comprising code configured to encode N digital signatures in N corresponding signature regions of a first image, each digital signature associated with at least one of N parties and code configured to separate the first encoded image into M portions, each portion including a first part of at least one of the N digital signatures. The program embodied in the computer-readable medium may further comprise code configured to provide one of the M portions to the party associated with a digital signature included in the one of the M portions. The program embodied in the computer-readable medium may further comprise: code configured to duplicate an original image to produce the first image for encoding and a second image; code configured to separate the second image into M portions, each of the M portions of the second image being substantially similar to the corresponding portion of the first encoded image; and code configured to combine a first portion of the first encoded image including the first part of a first of the N digital signatures with a second portion of the second image, the second portion of the second image corresponding to a second portion of the first encoded image including a second part of the first digital signature. The first portion of the first encoded image may include a first part of a second of the N digital signatures and the second portion of the first encoded image may include a second part of the second digital signature. The first portion of the first encoded image may include a first part of a third of the N digital signatures and the second portion of the first encoded image may include a second part of the third digital signature.

The program embodied in the computer-readable medium may further comprise code configured to combine the first portion of the first encoded image and the second part of the second image with a third portion of the second image, the first portion of the first encoded image including a first part of a second of the N digital signatures, the third portion of the second image corresponding to a third portion of the first encoded image including a second part of the second digital signature. The program embodied in the computer-readable medium may further comprise code configured to generate at least one of the N digital signatures from the first image. The code configured to generate the at least one digital signature may comprise code configured to compute a hash from the first image and code configured to encrypt the hash using a private key associated with the at least one of the N parties associated with the digital signature. The program embodied in the computer-readable medium may further comprise code configured to blank out the N corresponding signature regions of the first image before generating the at least one digital signature.

Another embodiment, among others, includes a method comprising: extracting a first image portion from an image selected by a first party, the first image portion including a first encoded part of an second party digital signature; obtaining a second image portion associated with the first image portion, the second image portion including a second encoded part of the second party digital signature; decoding the first and second encoded parts of the second party digital signature; and confirming validity of the second party digital signature based upon a second party public key. The first image portion may include a first encoded part of a first party digital signature and the second image portion may include a second encoded part of the first party digital signature. The method may further comprise providing the second image portion to the first party to confirm validity of the first party digital signature based upon a first party public key. The method may further comprise: computing a hash from the selected image; determining an index for the second image portion based upon the hash; and locating the second image portion in a database based upon the index. The hash may be computed from the first image portion of the selected image.

The method may further comprise decoding a second party public key encoded in the selected image based upon a passkey provided by the first party and confirming validity of the decoded second party public key. The second party public key may be associated with a Secure Sockets Layer connection. The method may further comprise confirming validity of biometric information based upon keyboard input of the passkey by the first party. The method may further comprise providing a prompt associated with the selected image to the first party and confirming validity of a response to the prompt. The prompt may be a question about the selected image. The method may further comprise decoding a first party public key encoded in the selected image based upon a passkey provided by the first party and confirming validity of a digital signature associated with a transaction based upon the decoded first party public key. The method may further comprise confirming validity of biometric information based upon keyboard input of the passkey by the first party. The method may further comprise decoding a machine identifier encoded in the selected image based upon a passkey provided by the first party and confirming the decoded machine identifier.

Another embodiment, among others, includes a system, comprising a processor circuit having a processor and a memory and an authentication system stored in the memory and executable by the processor, the authentication system comprising: logic configured to extract a first image portion from an image selected by a first party, the first image portion including a first encoded part of an second party digital signature; logic configured to obtain a second image portion associated with the first image portion, the second image portion including a second encoded part of the second party digital signature; logic configured to decode the first and second encoded parts of the second party digital signature; and logic configured to confirm validity of the second party digital signature based upon a second party public key. The first image portion may include a first encoded part of a first party digital signature and the second image portion may include a second encoded part of the first party digital signature. The authentication system may further comprise logic configured to provide the second image portion to the first party to confirm validity of the first party digital signature based upon a first party public key. The authentication system may further comprise: logic configured to compute a hash from the selected image; logic configured to determine an index for the second image portion based upon the hash; and logic configured to locate the second image portion in a database based upon the index. The hash may be computed from the first image portion of the selected image.

The authentication system may further comprise logic configured to decode a second party public key encoded in the selected image based upon a passkey provided by the first party; and logic configured to confirm validity of the decoded second party public key. The second party public key may be associated with a Secure Sockets Layer connection. The authentication system may further comprise logic configured to confirm validity of biometric information based upon keyboard input of the passkey by the first party. The authentication system may further comprise logic configured to provide a prompt associated with the selected image to the first party and logic configured to confirm validity of a response to the prompt. The prompt may be a question about the selected image. The authentication system may further comprise logic configured to decode a first party public key encoded in the selected image based upon a passkey provided by the first party and logic configured to confirm validity of a digital signature associated with a transaction based upon the decoded first party public key. The authentication system may further comprise logic configured to confirm validity of biometric information based upon keyboard input of the passkey by the first party. The authentication system may further comprise logic configured to decode a machine identifier encoded in the selected image based upon a passkey provided by the first party and logic configured to confirm the decoded machine identifier.

Another embodiment, among others, includes a system comprising: means for extracting a first image portion from an image selected by a first party, the first image portion including a first encoded part of an second party digital signature; means for obtaining a second image portion associated with the first image portion, the second image portion including a second encoded part of the second party digital signature; means for decoding the first and second encoded parts of the second party digital signature; and means for confirming validity of the second party digital signature based upon a second party public key. The first image portion may include a first encoded part of a first party digital signature and the second image portion may include a second encoded part of the first party digital signature. The system may further comprise means for providing the second image portion to the first party to confirm validity of the first party digital signature based upon a first party public key. The system may further comprise: means for computing a hash from the selected image; means for determining an index for the second image portion based upon the hash; and means for locating the second image portion in a database based upon the index. The hash may be computed from the first image portion of the selected image.

The system may further comprise means for decoding a second party public key encoded in the selected image based upon a passkey provided by the first party and means for confirming validity of the decoded second party public key. The second party public key may be associated with a Secure Sockets Layer connection. The system may further comprise means for confirming validity of biometric information based upon keyboard input of the passkey by the first party. The system may further comprise means for providing a prompt associated with the selected image to the first party and means for confirming validity of a response to the prompt. The prompt may be a question about the selected image. The system may further comprise means for decoding a first party public key encoded in the selected image based upon a passkey provided by the first party and means for confirming validity of a digital signature associated with a transaction based upon the decoded first party public key. The system may further comprise means for confirming validity of biometric information based upon keyboard input of the passkey by the first party. The system may further comprise means for decoding a machine identifier encoded in the selected image based upon a passkey provided by the first party and means for confirming the decoded machine identifier.

Another embodiment, among others, includes a program embodied in a computer-readable medium and executable by a computer system, comprising: code configured to extract a first image portion from an image selected by a first party, the first image portion including a first encoded part of an second party digital signature; code configured to obtain a second image portion associated with the first image portion, the second image portion including a second encoded part of the second party digital signature; code configured to decode the first and second encoded parts of the second party digital signature; and code configured to confirm validity of the second party digital signature based upon a second party public key. The first image portion may include a first encoded part of a first party digital signature and the second image portion may include a second encoded part of the first party digital signature. The program embodied in a computer-readable medium may further comprise code configured to provide the second image portion to the first party to confirm validity of the first party digital signature based upon a first party public key. The program embodied in a computer-readable medium may further comprise: code configured to compute a hash from the selected image; code configured to determine an index for the second image portion based upon the hash; and code configured to locate the second image portion in a database based upon the index. The hash may be computed from the first image portion of the selected image.

The program embodied in a computer-readable medium may further comprise code configured to decode a second party public key encoded in the selected image based upon a passkey provided by the first party and code configured to confirm validity of the decoded second party public key. The second party public key may be associated with a Secure Sockets Layer connection. The program embodied in a computer-readable medium may further comprise code configured to confirm validity of biometric information based upon keyboard input of the passkey by the first party. The program embodied in a computer-readable medium may further comprise code configured to provide a prompt associated with the selected image to the first party and code configured to confirm validity of a response to the prompt. The prompt may be a question about the selected image. The program embodied in a computer-readable medium may further comprise code configured to decode a first party public key encoded in the selected image based upon a passkey provided by the first party and code configured to confirm validity of a digital signature associated with a transaction based upon the decoded first party public key. The program embodied in a computer-readable medium may further comprise code configured to confirm validity of biometric information based upon keyboard input of the passkey by the first party. The program embodied in a computer-readable medium may further comprise code configured to decode a machine identifier encoded in the selected image based upon a passkey provided by the first party and code configured to confirm the decoded machine identifier.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims. In addition, although dependent claims are delineated herein as depending from specific independent or intermediate claims, it is understood that any claim recited herein may be multiply dependent such that any claim may depend from two or more claims, or comprise a combination of any two or more claims.

The invention claimed is:

1. A method, comprising:
   obtaining, in at least one processor system, a first image for encoding;
   encoding, in the at least one processor system, a first party digital signature in a first signature region of the first image and encoding a second party digital signature in a second signature region of the first image to produce a first encoded image; and
   separating, in the at least one processor system, the first encoded image into a first portion and a second portion, the first portion including a first part of the first party digital signature and a first part of the second party digital signature and the second portion including a second part of the first party digital signature and a second part of the second party digital signature.

2. The method of claim 1, further comprising generating the first party digital signature from the first image before encoding.

3. The method of claim 2, wherein generating the first party digital signature comprises:
   computing a hash from the first image; and
   encrypting the hash using a first party private key.

4. The method of claim 3, further comprising generating the second party digital signature by encrypting the hash using a second party private key.

5. The method of claim 2, further comprising blanking out the first signature region of the first image by zeroing out a predetermined number of least significant bits associated with pixels in the first signature region before generating the first party digital signature.

6. The method of claim 5, further comprising blanking out the second signature region of the first image by zeroing out a predetermined number of least significant bits associated with pixels in the second signature region before generating the first party digital signature.

7. The method of claim 1, further comprising providing the first portion of the first encoded image to a first party.

8. The method of claim 1, further comprising:
   duplicating an original image to produce the first image for encoding and a second image;
   separating the second image into a first portion and a second portion, the first portion of the second image being substantially similar to the first portion of the encoded image and the second portion of the second image being substantially similar to the second portion of the encoded image; and
   combining the first portion of the first encoded image with the second portion of the second image to form a first party combined image substantially similar to the received image.

9. The method of claim 8, further comprising providing the first party combined image to a first party.

10. The method of claim 8, further comprising encoding a first party private key into the second portion of the second image.

11. The method of claim 10, further comprising blanking out a first key region of the second portion of the second image by zeroing out a predetermined number of least significant bits associated with pixels in the first key region before encoding the first party private key in the blanked out first key region.

12. The method of claim 10, wherein the first party private key is encoded into the second portion of the second image before combining with the first portion of the first encoded image.

13. The method of claim 10, wherein the first party private key is encrypted using a first party password before encoding.

14. The method of claim 8, further comprising encoding a first party public key into the second portion of the second image.

15. The method of claim 8, further comprising encoding a second party public key into the second portion of the second image.

16. The method of claim 8, wherein the original image is selected by a first party.

17. The method of claim 8, further comprising reformatting the original image before duplicating.

18. The method of claim 8, further comprising generating a first party private key and a first party public key from the original image.

19. A method, comprising:
   obtaining, in at least one processor system, a first image for encoding;
   encoding, in the at least one processor system, a plurality of N digital signatures in N corresponding signature regions of the first image, each digital signature associated with at least one of N parties; and
   separating, in the at least one processor system, the first encoded image into a plurality of M portions, each portion including a first part of at least one of the N digital signatures.

20. The method of claim 19, further comprising providing one of the M portions to the party associated with a digital signature included in the one of the M portions.

21. The method of claim 19, further comprising:
   duplicating an original image to produce the first image for encoding and a second image;
   separating the second image into M portions, each of the M portions of the second image being substantially similar to the corresponding portion of the first encoded image; and
   combining a first portion of the first encoded image including the first part of a first of the N digital signatures with a second portion of the second image, the second portion of the second image corresponding to a second portion of the first encoded image including a second part of the first digital signature.

22. The method of claim 21, wherein the first portion of the first encoded image includes a first part of a second of the N digital signatures and the second portion of the first encoded image includes a second part of the second digital signature.

23. The method of claim 22, wherein the first portion of the first encoded image includes a first part of a third of the N digital signatures and the second portion of the first encoded image includes a second part of the third digital signature.

24. The method of claim 21, further comprising combining the first portion of the first encoded image and the second part of the second image with a third portion of the second image, the first portion of the first encoded image including a first part of a second of the N digital signatures, the third portion of the second image corresponding to a third portion of the first encoded image including a second part of the second digital signature.

25. The method of claim 19, further comprising generating at least one of the N digital signatures from the first image.

26. The method of claim 25, wherein generating the at least one digital signature comprises:
computing a hash from the first image; and
encrypting the hash using a private key associated with the at least one of the N parties associated with the digital signature.

27. The method of claim 25, further comprising blanking out the N corresponding signature regions of the first image by zeroing out a predetermined number of least significant bits associated with pixels in the corresponding signature regions before generating the at least one digital signature.

28. A method, comprising:
extracting, in at least one processor system, a first image portion from an image selected by a first party, the first image portion including a first encoded part of a second party digital signature;
obtaining, in the at least one processor system, a second image portion associated with the first image portion, the second image portion including a second encoded part of the second party digital signature;
decoding, in the at least one processor system, the first and second encoded parts of the second party digital signature from the first and second image portions; and
confirming, in the at least one processor system, validity of the second party digital signature based upon a second party public key.

29. The method of claim 28, wherein the first image portion includes a first encoded part of a first party digital signature and the second image portion includes a second encoded part of the first party digital signature.

30. The method of claim 29, further comprising providing the second image portion to the first party to confirm validity of the first party digital signature based upon a first party public key.

31. The method of claim 28, further comprising:
computing a hash from the selected image;
determining an index for the second image portion based upon the hash; and
locating the second image portion in a database based upon the index.

32. The method of claim 31, wherein the hash is computed from the first image portion of the selected image.

33. The method of claim 28, further comprising:
decoding a second party public key encoded in the selected image based upon a passkey provided by the first party; and
confirming validity of the decoded second party public key.

34. The method of claim 33, where the second party public key is associated with a Secure Sockets Layer connection.

35. The method of claim 33, further comprising confirming validity of biometric information based upon keyboard input of the passkey by the first party.

36. The method of claim 28, further comprising:
providing a prompt associated with the selected image to the first party; and
confirming validity of a response to the prompt.

37. The method of claim 36, wherein the prompt is a question about the selected image.

38. The method of claim 28, further comprising:
decoding a first party public key encoded in the selected image based upon a passkey provided by the first party; and
confirming validity of a digital signature associated with a transaction based upon the decoded first party public key.

39. The method of claim 38, further comprising confirming validity of biometric information based upon keyboard input of the passkey by the first party.

40. The method of claim 28, further comprising:
decoding a machine identifier encoded in the selected image based upon a passkey provided by the first party; and
confirming the decoded machine identifier.

* * * * *